(12) United States Patent
Yoshida

(10) Patent No.: US 7,889,433 B2
(45) Date of Patent: Feb. 15, 2011

(54) IMMERSION TYPE MICROSCOPE OBJECTIVE LENS

(75) Inventor: Miwako Yoshida, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/765,228

(22) Filed: Apr. 22, 2010

(65) Prior Publication Data

US 2010/0202062 A1 Aug. 12, 2010

Related U.S. Application Data

(63) Continuation of application No. PCT/JP2008/069702, filed on Oct. 23, 2008.

(30) Foreign Application Priority Data

Nov. 2, 2007 (JP) ............................. 2007-286022
Jul. 25, 2008 (JP) ............................. 2008-192613

(51) Int. Cl.
*G02B 21/02* (2006.01)
*G02B 9/12* (2006.01)
*G02B 27/02* (2006.01)

(52) U.S. Cl. ...................... 359/661; 359/656; 359/787; 359/788; 359/791; 359/798; 359/799

(58) Field of Classification Search ................. 359/656, 359/661, 787, 788, 791, 798, 799

See application file for complete search history.

(56) References Cited

U.S. PATENT DOCUMENTS

| | | | |
|---|---|---|---|
| 3,700,311 A * | 10/1972 | Shoemaker | ................. 359/656 |
| 5,530,590 A | 6/1996 | Saito | |
| 5,982,559 A * | 11/1999 | Furutake | ..................... 359/656 |
| 6,519,092 B2 * | 2/2003 | Yamaguchi | ................. 359/656 |
| 6,747,804 B2 | 6/2004 | Fujimoto et al. | |
| 7,046,451 B2 * | 5/2006 | Mandai et al. | .............. 359/661 |
| 7,158,310 B2 | 1/2007 | Sakakura et al. | |
| 7,262,922 B2 | 8/2007 | Yamaguchi | |
| 2002/0024744 A1 | 2/2002 | Kasahara | |

FOREIGN PATENT DOCUMENTS

| | | |
|---|---|---|
| JP | 2002-031760 A | 1/2002 |
| JP | 2003-172879 A | 6/2003 |
| JP | 2004-341394 A | 12/2004 |
| JP | 2006-065030 A | 3/2006 |

* cited by examiner

*Primary Examiner*—Evelyn A. Lester
(74) *Attorney, Agent, or Firm*—Miles & Stockbridge P.C.

(57) ABSTRACT

An immersion type microscope objective lens OL includes, in order from a cover plate C side, a first lens group G1 having positive refractive power, a second lens group G2 having positive refractive power, and a third lens group G3 having negative refractive power. The first lens group G1 includes at least one cemented lens. The second lens group G2 includes at least two achromatic lenses. The third lens group G3 includes, in order from the object side, an achromatic lens CL31 having a strong concave surface facing an image side, and an achromatic lens CL32 having a strong concave surface facing the object side.

2 Claims, 15 Drawing Sheets

IMMERSION TYPE MICROSCOPE OBJECTIVE LENS

CROSS-REFERENCE TO RELATED APPLICATION

This application is a continuation of International Application No. PCT/JP2008/069702 filed Oct. 23, 2008.

TECHNICAL FIELD

The present invention relates to an objective lens used for an immersion type microscope.

BACKGROUND ART

Recently, fluorescence observation using further longer wavelength than that in a conventional microscope has become to be carried out, so that an optical system having excellent optical performance in near-infrared wavelength range has been desired. For example, in a multi photon observation such as a two photon observation, in order to observe fluorescence in visible light by exciting a sample with longer wavelength illumination light, a microscope objective lens that excellently corrects chromatic aberration both in near-infrared light and in visible light has been increasingly desired. Moreover, in application in an optical tweezers also, the optical system is necessary to be excellently corrected in near-infrared range as well as in visible light range. There has been known an objective lens whose chromatic aberration is corrected in wavelength range from 400 nm to 1000 nm disclosed in Japanese Patent Application Laid-Open No. 2006-065030.

However, since a bright observation image with high resolution is necessary in fluorescence observation, such an objective lens has been required to have a large numerical aperture. Accordingly, in a conventional objective lens, there has been a problem that a numerical aperture thereof is not sufficient.

DISCLOSURE OF THE INVENTION

The present invention is made in view of aforementioned problems, and has an object to provide an immersion type microscope objective lens having magnification of about 60, and a high numerical aperture (about NA=1.25) with excellently correcting chromatic aberration from visible light range up to near-infrared range (up to t-line: λ=1013.98 nm).

In order to solve the problems, according to the present invention, there is provided an immersion type microscope objective lens comprising, in order from an object side: a first lens group having positive refractive power; a second lens group having positive refractive power; and a third lens group having negative refractive power; the first lens group including at least one cemented lens, the second lens group including at least two achromatic lenses, each of which includes a positive lens and a negative lens, the third lens group being composed of, in order from the object side, an achromatic lens that includes a positive lens and a negative lens and has a strong concave surface facing an image side (for example, the cemented lens CL31 in the embodiment), and an achromatic lens that includes a positive lens and a negative lens and has a strong concave surface facing the object side (for example, the cemented lens CL32 in the embodiment), the following conditional expression being satisfied:

$$1.5 \leq n32 \leq 1.65,$$

where n32 denotes a refractive index at d-line of a glass material of the positive lens (for example, the double convex lens L16 in the embodiment) included in the achromatic lens disposed to the most image side in the third lens group, when Pt is defined by the following expression:

$$Pt=(nd-nt)/(ng-nd)$$

where nd denotes a refractive index at d-line of a glass material of each lens included in the achromatic lens disposed to the most image side in the third lens group, nt denotes a refractive index at t-line thereof, and ng denotes a refractive index at g-line thereof, and when ΔPt3 and Δvd3 is defined by the following expressions:

$$\Delta Pt3 = |Pt31 - Pt32|$$

$$\Delta vd3 = |vd31 - vd32|$$

where Pt31 denotes the Pt value of the negative lens (for example, the double concave lens L15 in the embodiment) included in the achromatic lens disposed to the most image side of the third lens group, vd31 denotes an Abbe number thereof, Pt32 denotes the Pt value of the positive lens included in the achromatic lens disposed to the most image side of the third lens group, vd32 denotes an Abbe number thereof, ΔPt3 and Δvd3 satisfying the following conditional expression:

$$0.0035 \leq \Delta Pt3/\Delta vd3 \leq 0.0062$$

and the following conditional expression being satisfied:

$$15 \leq |f3/fa|$$

where f3 denotes a focal length of the achromatic lens disposed to the most image side among achromatic lenses included in the third lens group, and fa denotes a focal length of the microscope objective lens; one cemented lens included in the first lens group (for example, the cemented lens CL11 in the embodiment) being disposed to the most object side of the first lens group and constructed by, in order from the object side, a first meniscus lens (for example, positive meniscus lens L1 in the embodiment) having a concave surface facing the object side cemented with a second meniscus lens (for example, negative meniscus lens L2 in the embodiment) having a concave surface facing the object side; and the following conditional expression being satisfied:

$$0.2 \leq |r1/f1| \leq 4.5$$

where r1 denotes a radius of curvature of the object side surface of the first meniscus lens included in the cemented lens disposed to the most object side of the first lens group, and f1 denotes a focal length of the cemented lens in which the first meniscus lens is included.

In the immersion type microscope objective lens according to the present invention, it is preferable that the following conditional expression is satisfied:

$$0.25 \leq |\Phi1 + \Phi2| \leq 0.35$$

where Φ1 denotes power of the concave surface of the achromatic lens having a strong concave surface facing the image side among achromatic lenses included in the third lens group, and Φ2 denotes power of the concave surface of the achromatic lens having a strong concave surface facing the object side among achromatic lenses included in the third lens group. Incidentally, power Φ of a surface is defined by the following expression:

$$\Phi = (n'-n)/r$$

where n and n' denote refractive indices of backward and forward sides of the surface respectively, and r denotes a radius of curvature of the surface.

Although no specific explanation is made, the focal length and power that are basic specifications of a lens system in the present invention are values with respect to the reference wavelength of d-line.

When the immersion type microscope objective lens according to the present invention is constructed as described above, it becomes possible to excellently correct various aberrations in broad wavelength range from visible light to near infrared light with having magnification of about 60, and a high numerical aperture of about NA=1.25.

EMBODIMENT FOR CARRYING OUT THE INVENTION

A preferred embodiment of the present invention is explained with reference to accompanying drawings. At first, a configuration of an immersion type microscope objective lens (hereinafter called as a microscope objective lens OL) according to the present invention is explained with reference to FIG. 1. The microscope objective lens OL is an objective lens used for a microscope in which a sample (object) is placed under a cover plate C and the sample is observed with immersing a tip of the objective lens in an immersion. The objective lens OL is composed of, in order from the object side (a cover plate C side), a first lens group G1 having positive refractive power, a second lens group G2 having positive refractive power, and a third lens group G3 having negative refractive power.

Figure 1:
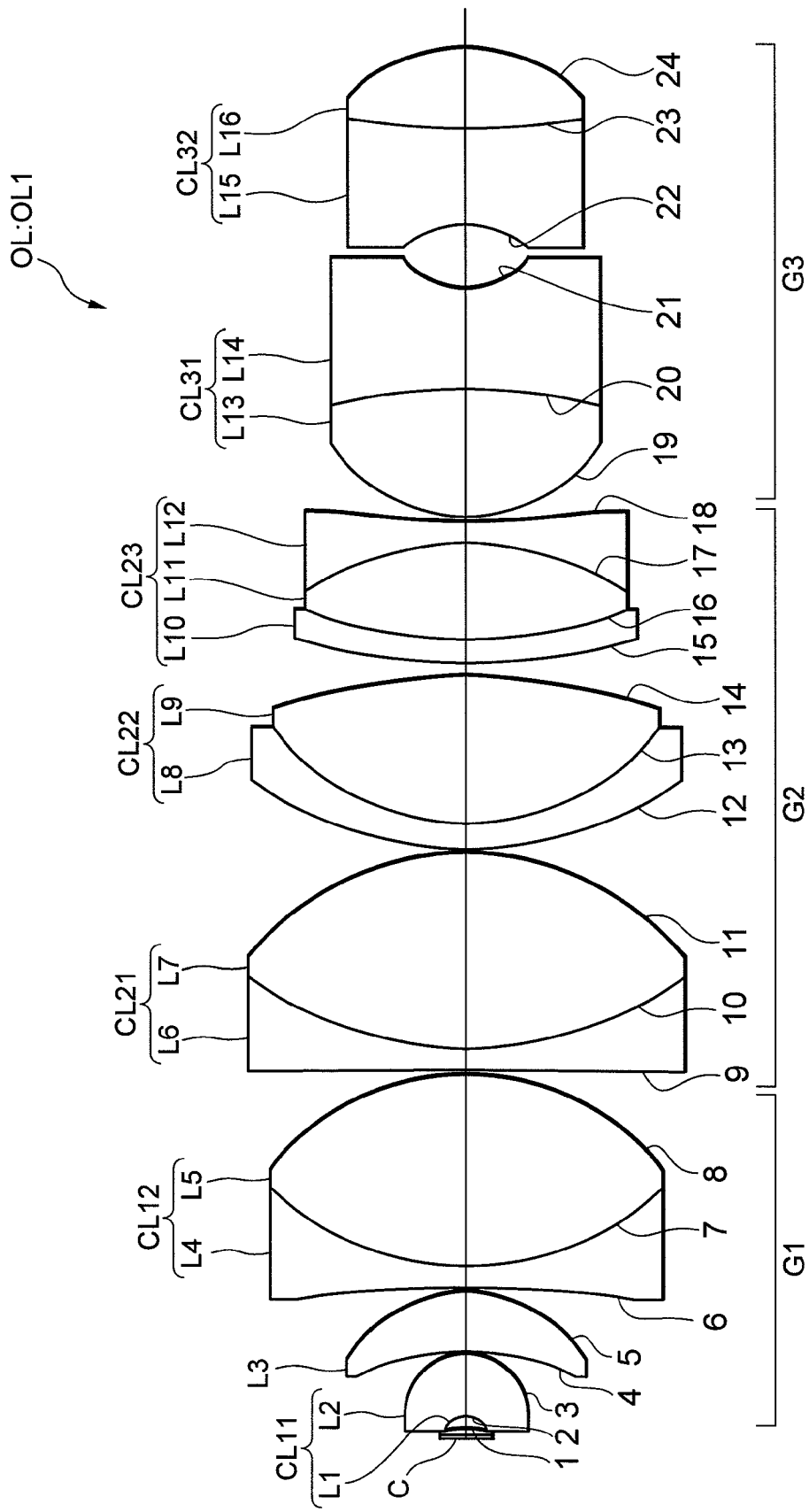
FIG. 1 is a schematic diagram showing a lens construction of an immersion type microscope objective lens according to Example 1 of the present invention.

In such a microscope objective lens OL, the first lens group G1 is a lens group that converges divergent light come out from the object, and has at least one cemented lens (in FIG. 1, two cemented lenses CL11 and CL12 are there). In particular, among the cemented lenses composing the first lens group G1, the cemented lens CL11 is disposed to the most object side of the first lens group G1 (in other words, the most object side of the microscope objective lens OL), and composed of, in order from the object side, a first meniscus lens (positive meniscus lens) L1 having a concave surface facing the object side cemented with a second meniscus lens (negative meniscus lens) L2 having a concave surface facing the object side. Since the first meniscus lens L1 is composed of a positive meniscus lens having a weak concave surface facing the object side, an incident angle incident on the weak concave surface is made not to become large as much as possible, so that high order spherical aberration generated from the boundary (the first surface in FIG. 1) between the first meniscus lens L1 and the immersion can be reduced effectively. Moreover, since the cemented surface (the second surface in FIG. 1) between the first meniscus lens L1 and the second meniscus lens L2 has strong negative power, Petzval sum can be reduced effectively.

The second lens group G2 is a lens group that further converges the light converged by the first lens group G1, and composed of at least two achromatic lenses that is constructed by a positive lens and a negative lens (in FIG. 1, three achromatic lenses CL21, CL22 and CL23 are included). Among these achromatic lenses, the achromatic lens CL21 disposed to the most object side of the second lens group G2 is disposed in the vicinity of a position where a diameter of the light flux becomes largest, and has a function to correct mainly chromatic difference in spherical aberration, and the rest of achromatic lenses CL22 and CL23 have a function to correct mainly longitudinal chromatic aberration in consideration of secondary spectrum.

The third lens group G3 is a lens group that makes the light converged by the second lens group G2 parallel, and is a so-called Gaussian type that is composed of, in order from the object side, an achromatic lens CL31 having a strong concave surface facing the image side constructed by a positive lens and a negative lens in this order, and an achromatic lens CL32 having a strong concave surface facing the object side constructed by a negative lens and a positive lens in this order. The third lens group G3 is constructed by the two achromatic lenses CL31 and CL32 to reduce Petzval sum, which cannot have been fully reduced by the first lens group G1, and corrects curvature of field as a whole in addition to correcting spherical aberration and chromatic aberration.

Then, conditions for constituting such a microscope objective lens OL are explained below. In the microscope objective lens OL, when a refractive index of a glass material of the positive lens (double convex lens L16 in FIG. 1) composing the achromatic lens CL32 disposed to the most image side of the third lens group G3 at d-line is denoted by n32, the following conditional expression (1) is satisfied:

$$1.5 \leq n32 \leq 1.65 \tag{1}$$

Conditional expression (1) is for the refractive index of the positive lens composing the achromatic lens CL32 disposed to the most image side of the third lens group G3. When the value n32 exceeds the upper limit of conditional expression (1), difference in refractive index to the negative lens (double concave lens L15 in FIG. 1) composing the achromatic lens CL32 becomes too large resulting in excessive generation of chromatic difference in coma, so that it is undesirable. On the other hand, when the value n32 falls below the lower limit of conditional expression (1), Petzval sum becomes large resulting in deteriorating evenness of the image, so that it is undesirable.

In the microscope objective lens OL, when a refractive index at d-line of glass material of each lens composing the achromatic lens CL32 disposed to the most image side of the third lens group G3 is denoted by nd, that at t-line is denoted by nt, and that at g-line is denoted by ng, and Pt is defined by the following expression (a), Pt value of the negative lens (double concave lens L15) composing the achromatic lens CL32 disposed to the most image side of the third lens group G3 is denoted by Pt31, an Abbe number thereof is denoted by vd31, the Pt value of the positive lens (double convex lens L16) is denoted by Pt32, and an Abbe number thereof is denoted by vd32, and $\Delta Pt3$ is defined by the following expression (b), and $\Delta vd3$ is defined by the following expression (c), $\Delta Pt3$ and $\Delta vd3$ satisfy the following conditional expression (2):

$$0.0035 \leq \Delta Pt3/\Delta vd3 \leq 0.0062 \quad (2)$$

$$\text{where } Pt=(nd-nt)/(ng-nd) \quad (a)$$

$$\Delta Pt3=|Pt31-Pt32| \quad (b)$$

$$\Delta vd3=|vd31-vd32| \quad (c).$$

Conditional expression (2) is for correcting chromatic aberration over broad wavelength range in the microscope objective lens OL. When the ratio $\Delta Pt3/\Delta vd3$ exceeds the upper limit of conditional expression (2), chromatic aberration in near infrared range becomes overcorrected, so that it is undesirable. On the other hand, when the ratio $\Delta Pt3/\Delta vd3$ falls below the lower limit of conditional expression (2), chromatic aberration in near infrared range becomes undercorrected, so that it is undesirable.

Moreover, in the microscope objective lens OL, when a focal length of an achromatic lens CL32 disposed to the most image side composing the third lens group G3 is denoted by f3, and a focal length of the microscope objective lens OL is denoted by fa, the following conditional expression (3) is satisfied:

$$15 \leq |f3/fa| \quad (3).$$

Conditional expression (3) defines a focal length of an achromatic lens CL32 disposed to the most image side composing the third lens group G3 with respect to a focal length of the microscope objective lens OL. When the ratio $|f3/fa|$ falls below the lower limit of conditional expression (3), an angle of incidence of the light come out from the image side concave surface of the achromatic lens CL31 disposed to the object side incident on the strong concave surface disposed to the object side of the achromatic lens CL32 disposed to the most image side becomes large, and as a result, high order coma becomes unable to be corrected, so that it is undesirable.

Moreover, in the microscope objective lens OL, when a radius of curvature of the object side surface of the first meniscus lens (positive meniscus lens L1) composing the cemented lens CL11 disposed to the most object side of the first lens group G1 is denoted by r1, and a focal length of the cemented lens CL11 is denoted by f1, the following conditional expression (4) is satisfied:

$$0.2 \leq |r1/f1| \leq 4.5 \quad (4).$$

Conditional expression (4) is for defining a radius of curvature of the object side surface (in other words, the first surface that is immersed by the immersion) of the first meniscus lens composing the cemented lens CL11 disposed to the most object side of the first lens group G1. When the value $|r1/f1|$ exceeds the upper limit of conditional expression (4), an angle of incidence of light flux from the object becomes too large, and as a result, high order spherical aberration becomes difficult to be corrected by the lenses in the rear lens group, so that it is undesirable. On the other hand, when the ratio $|r1/f1|$ falls below the lower limit of conditional expression (4), bubbles and foreign particles in the immersion get in the space formed by the object side surface of the first meniscus lens L1, so that it becomes difficult to remove them. In order to obtain further excellent optical performance, it is preferable to set the lower limit of conditional expression (4) to 0.3, and the upper limit thereof to 2.

Moreover, in the microscope objective lens OL, when power of the concave surface (the twenty-first surface in FIG. 1) of the achromatic lens CL31 having a strong concave surface facing the image side among achromatic lenses composing the third lens group G3 is denoted by $\Phi 1$, and power of the concave surface (the twenty-second surface in FIG. 1) of the achromatic lens CL32 having a strong concave surface facing the object side among achromatic lenses composing the third lens group G3 is denoted by $\Phi 2$, the following conditional expression (5) is satisfied:

$$0.25 \leq |\Phi 1+\Phi 2| \leq 0.35 \quad (5).$$

Conditional expression (5) is for defining power of concave surfaces of the Gauss type achromatic lens group composing the third lens group G3 opposite with each other. When the value $|\Phi 1+\Phi 2|$ exceeds the upper limit of conditional expression (5), high order coma is generated by the third lens group G3, and as a result, it becomes difficult to be corrected, so that it is undesirable. On the other hand, when the value $|\Phi 1+\Phi 2|$ falls below the lower limit of conditional expression (5), Petzval sum cannot be corrected by the third lens group G3, and as a result, flatness of the image becomes worse, so that it is undesirable.

EXAMPLE

Figure 15:
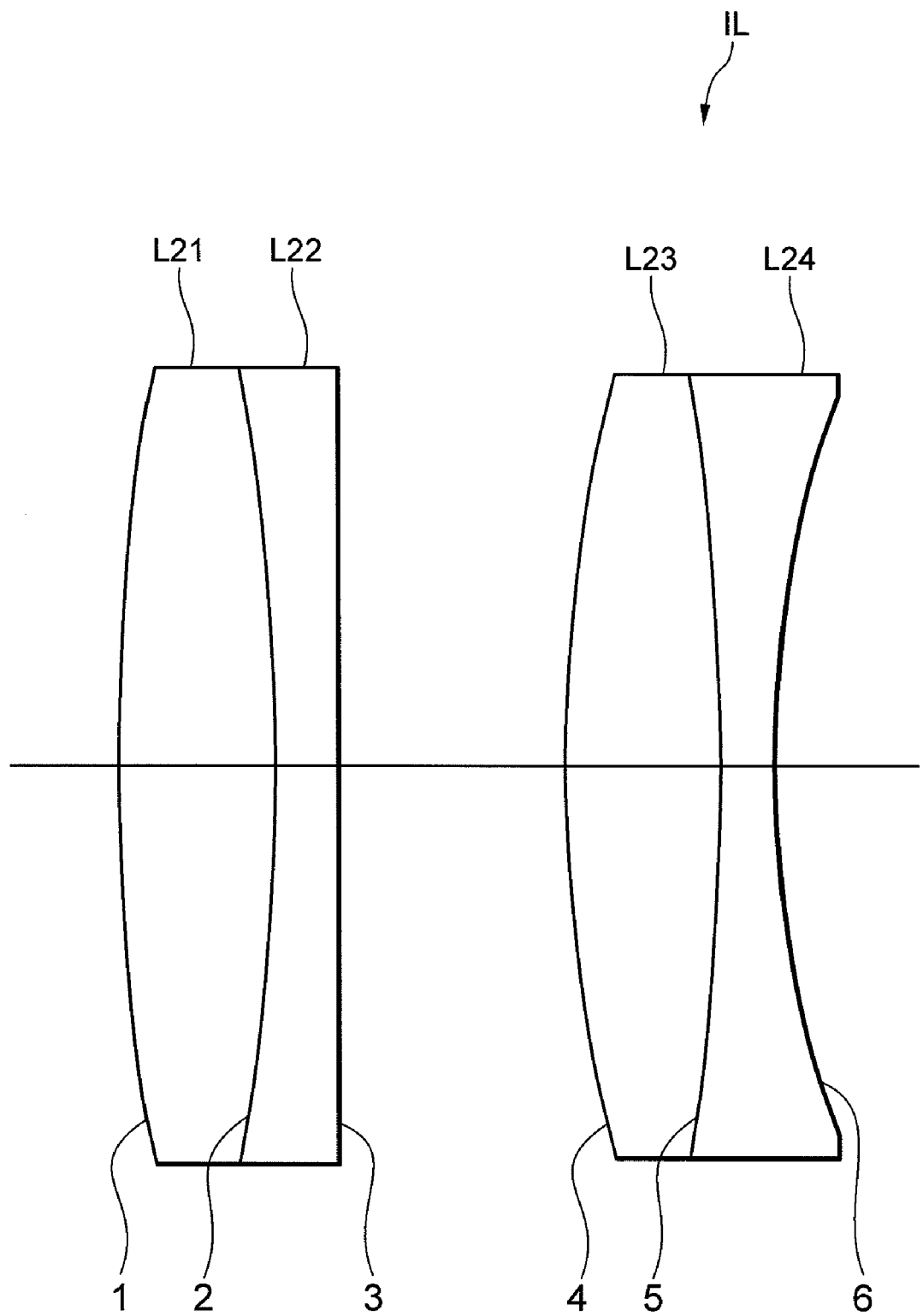
FIG. 15 is a schematic diagram showing a lens construction of an imaging lens used together with the above-described immersion type microscope objective lens.

Seven Examples of the microscope objective lens OL according to the present invention are shown below. Since the microscope objective lens OL according to the present embodiment is an infinity correction type, it is used together with an imaging lens IL whose construction is listed in Table 1 and shown in FIG. 15. In Table 1, the first column "m" shows surface numbers listed in order from an object side, Which are corresponding to the surface numbers 1 through 6 shown in FIG. 15. The second column "r" shows a radius of curvature of each optical surface, the third column "d" shows a distance along the optical axis from each optical surface to the next optical surface, the fourth column "nd" shows a refractive index at d-line, and the fifth column "vd" shows an Abbe number. The explanation of the specification table is the same in the other Examples.

TABLE 1

| m | r | d | nd | vd |
|---|---|---|---|---|
| 1 | 75.043 | 5.1 | 1.62280 | 57.0 |
| 2 | −75.043 | 2 | 1.74950 | 35.2 |
| 3 | 1600.58 | 7.5 | | |
| 4 | 50.256 | 5.1 | 1.66755 | 42.0 |

TABLE 1-continued

| m | r | d | nd | vd |
|---|---|---|----|-----|
| 5 | −84.541 | 1.8 | 1.61266 | 44.4 |
| 6 | 36.911 | | | |

The imaging lens IL is composed of, in order from an object side, a cemented lens constructed by a double convex lens L21 cemented with a double concave lens L22, and a cemented lens constructed by a double convex lens L23 cemented with a double concave lens L24.

In the following Examples, as for an immersion liquid, water having nd=1.3326 and vd=55.9 is used. A cover glass C is designed such that a thickness t=0.17, nd=1.5244 and vd=54.3.

Example 1

FIG. 1 used in the above explanation shows a microscope objective lens OL1 according to Example 1 of the present invention. As described above, the microscope objective lens OL1 is composed of, in order from a cover plate C side, a first lens group G1 having positive refractive power, a second lens group G2 having positive refractive power, and a third lens group G3 having negative refractive power. The first lens group G1 is composed of a cemented lens CL11 constructed by a positive meniscus lens (the first meniscus lens) L1 having a concave surface facing an object side cemented with a negative meniscus lens (the second meniscus lens) L2 having a concave surface facing the object side, a positive meniscus lens L3 having a concave surface facing the object side, and a cemented lens CL12 constructed by a double concave lens L4 cemented with a double convex lens L5. The second lens group G2 is composed of an achromatic lens CL21 constructed by a double concave lens L6 cemented with a double convex lens L7, an achromatic lens CL22 constructed by a negative meniscus lens L8 having a convex surface facing the object side cemented with a double convex lens L9, and an achromatic lens CL23 constructed by a negative meniscus lens L10 having a convex surface facing the object side cemented with a double convex lens L11 cemented with a double concave lens L12. The third lens group G3 is composed of an achromatic lens CL31 constructed by a double convex lens L13 cemented with a double concave lens L14, and an achromatic lens CL32 constructed by a double concave lens L15 cemented with a double convex lens L16.

Various values associated with the microscope objective lens OL1 according to Example 1 shown in FIG. 1 are listed in Table 2. In Table 2, f denotes a focal length of the microscope objective lens, NA denotes a numerical aperture, β denotes magnification, and d0 denotes a distance along an optical axis from the cover glass C to a vertex of an object side surface (the first surface) of the first lens (the positive meniscus lens L1). Incidentally, the numbers 1 through 24 of optical surfaces shown in the first column "m" are corresponding respectively to the surface numbers 1 through 24 shown in FIG. 1. In Table 2, values corresponding to respective conditional expressions (1) through (5), in other words, values for conditional expressions are shown. The explanations of Tables are the same in the other Examples.

In respective tables for various values, "mm" is generally used for the unit of length such as the focal length f, the radius of curvature r and the distance to the next lens surface d. However, since similar optical performance can be obtained by an optical system proportionally enlarged or reduced its dimension, the unit is not necessarily to be limited to "mm", and any other suitable unit can be used.

TABLE 2

$f = 3.33$
$NA = 1.25$
$\beta = 60x$
$d0 = 0.25$

| m | r | d | nd | vd |
|---|---|---|----|-----|
| 1 | −10.000 | 0.63 | 1.45850 | 67.8 |
| 2 | −1.051 | 2.82 | 1.83481 | 42.7 |
| 3 | −2.921 | 0.10 | | |
| 4 | −12.431 | 2.75 | 1.59240 | 68.3 |
| 5 | −6.681 | 0.15 | | |
| 6 | −63.897 | 1.00 | 1.51742 | 52.4 |
| 7 | 13.457 | 8.85 | 1.49782 | 82.5 |
| 8 | −11.960 | 0.20 | | |
| 9 | −636.078 | 1.00 | 1.81600 | 46.6 |
| 10 | 17.160 | 9.05 | 1.43385 | 95.2 |
| 11 | −13.417 | 0.20 | | |
| 12 | 17.111 | 1.20 | 1.75500 | 52.3 |
| 13 | 11.170 | 6.90 | 1.43385 | 95.2 |
| 14 | −26.536 | 0.60 | | |
| 15 | 27.985 | 1.10 | 1.81600 | 46.6 |
| 16 | 20.792 | 4.50 | 1.43385 | 95.2 |
| 17 | −13.585 | 1.00 | 1.81600 | 46.6 |
| 18 | 46.225 | 0.20 | | |
| 19 | 7.409 | 5.90 | 1.49782 | 82.5 |
| 20 | −28.987 | 4.60 | 1.64000 | 60.1 |
| 21 | 3.708 | 2.90 | | |
| 22 | −4.496 | 4.40 | 1.60300 | 65.4 |
| 23 | 36.446 | 3.70 | 1.57501 | 41.5 |
| 24 | −7.761 | | | |

[Values for Conditional Expressions]

Figure 2:
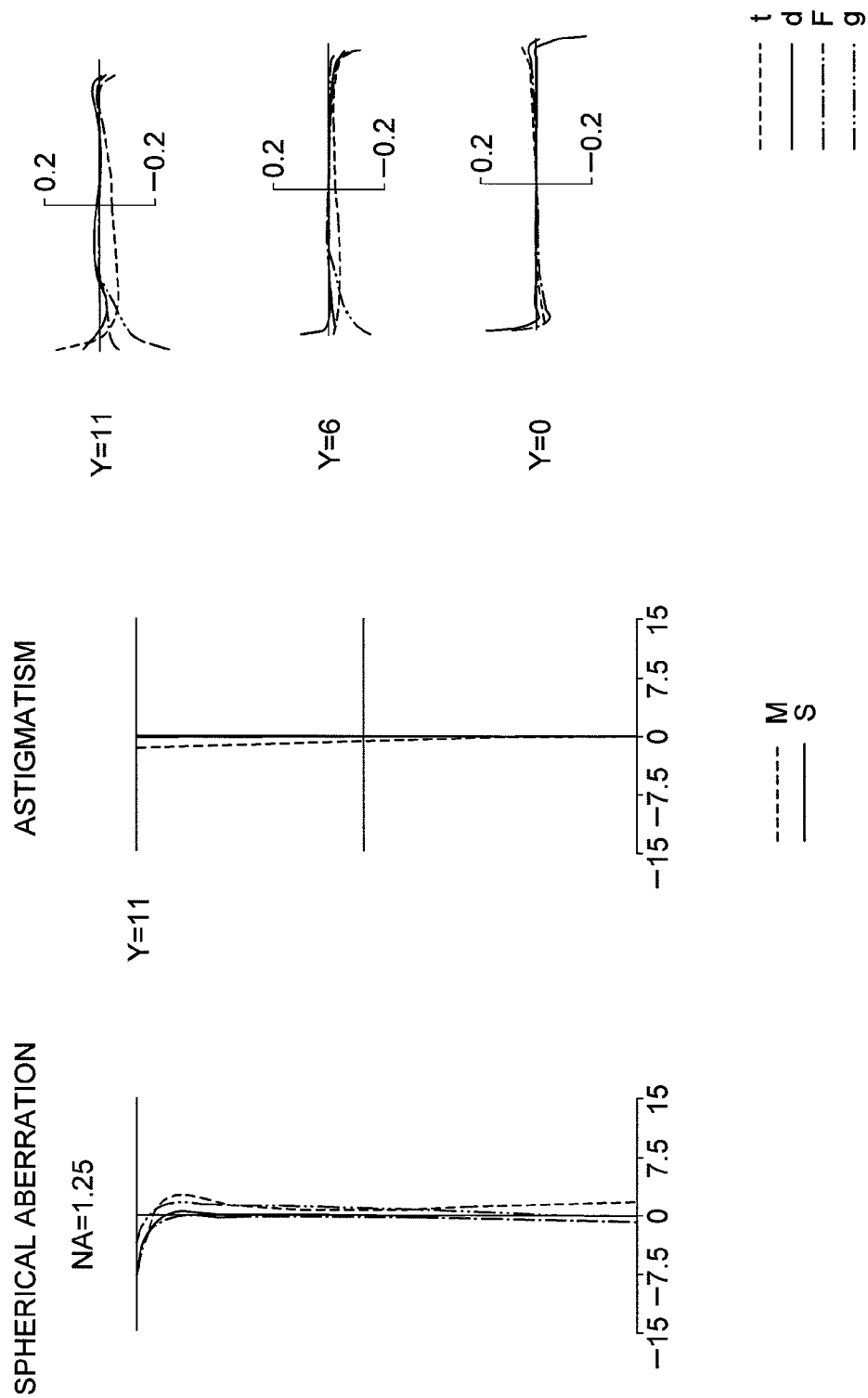
FIG. 2 shows various aberrations of the immersion type microscope objective lens according to Example 1.

(1) $n32 = 1.57501$
(2) $\Delta Pt3/\Delta vd3 = 0.0041$
(3) $|f3/fa| = 29.2$
(4) $|r1/f1| = 0.61$
(5) $|\Phi 1 + \Phi 2| = 0.31$ As shown above, in Example 1, conditional expressions (1) through (5) are all satisfied. Various aberrations such as spherical aberration, astigmatism and coma with respect to t-line (1013.98 nm), d-line (587.5620 nm), F-line (486.1330 nm) and g-line (435.8350 nm) are shown in FIG. 2. In graphs showing spherical aberration, a value of a numerical aperture NA is shown. In graphs showing astigmatism, a value of an image height Y is shown. In graphs showing coma, values with respect to the image height Y=11 mm, 6 mm and 0 mm are shown. In graphs showing spherical aberration and coma, a dotted line shows t-line, a solid line shows d-line, a chain line shows F-line and a chain double-dotted line shows g-line. In graphs showing astigmatism, a broken line indicates a meridional image plane, and a solid line indicates a sagittal image plane. The above-described explanations for aberrations are the same in the other Examples. As is apparent from various aberrations shown in FIG. 2, Example 1 shows superb optical performance as a result of good corrections to various aberrations from visible light range to near-infrared light range.

Example 2

Figure 3:
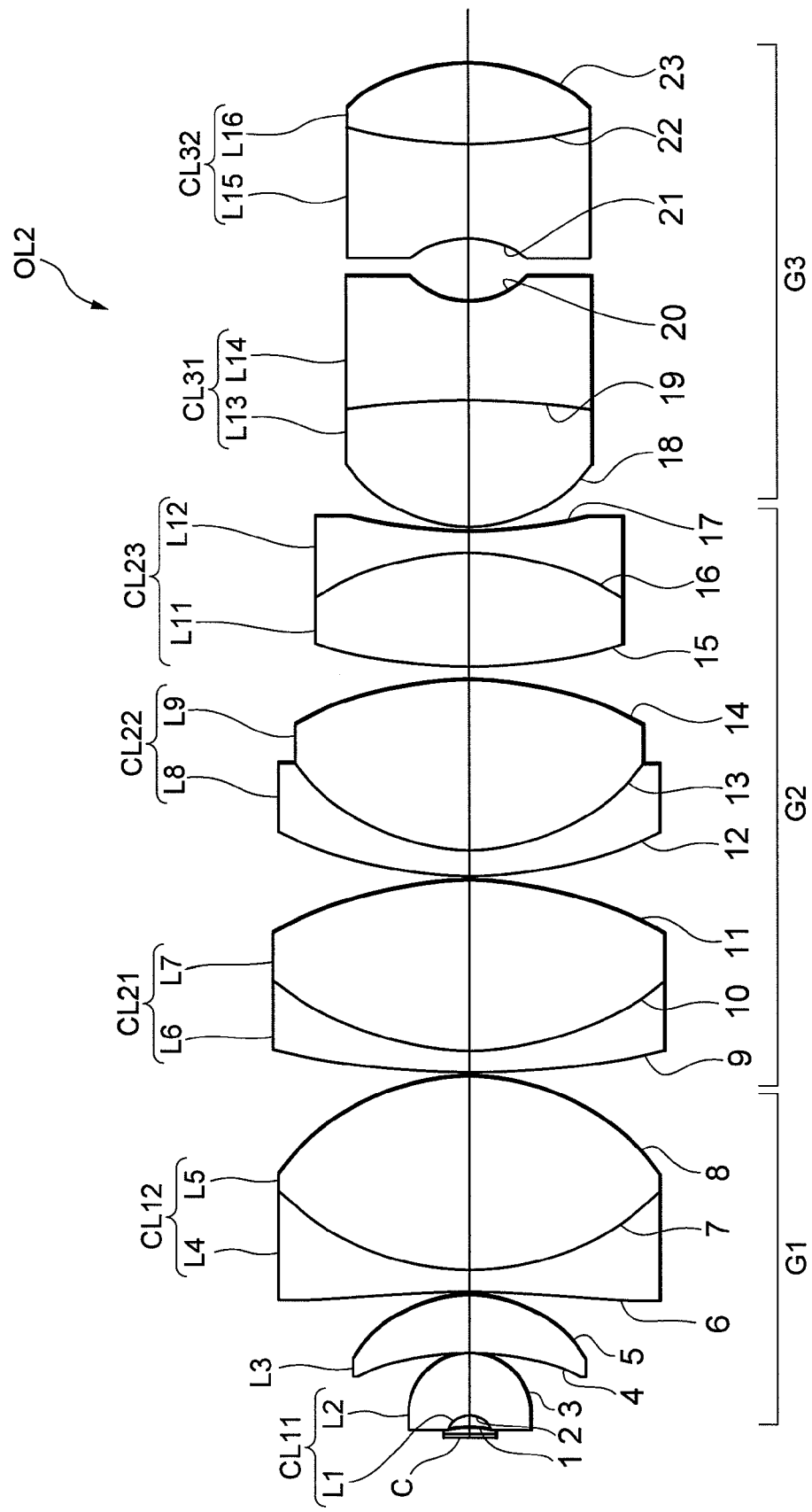
FIG. 3 is a schematic diagram showing a lens construction of an immersion type microscope objective lens according to Example 2 of the present invention.

Then, a microscope objective lens OL2 shown in FIG. 3 is explained as Example 2. The microscope objective lens OL2 shown in FIG. 3 is composed of, in order from the cover glass C side, a first lens group G1 having positive refractive power, a second lens group G2 having positive refractive power and a third lens group G3 having negative refractive power. The first lens group G1 is composed of a cemented lens CL11 constructed by a positive meniscus lens L1 (the first meniscus lens) having a concave surface facing the object side cemented with a negative meniscus lens L2 (the second meniscus lens) having a concave surface facing the object side, a positive meniscus lens L3 having a concave surface facing the object side, and a cemented lens CL12 constructed by a double concave lens L4 cemented with a double convex lens L5. The second lens group G2 is composed of an achromatic lens CL21 constructed by a negative meniscus lens L6 having a convex surface facing the object side cemented with a double convex lens L7, an achromatic lens CL22 constructed by a negative meniscus lens L8 having a convex surface facing the object side cemented with a double convex lens L9, and an achromatic lens CL23 constructed by a double convex lens L11 cemented with a double concave lens L12. The third lens group G3 is composed of an achromatic lens CL31 constructed by a double convex lens L13 cemented with a double concave lens L14, and an achromatic lens CL32 constructed by a double concave lens L15 cemented with a double convex lens L16.

Various values associated with the microscope objective lens OL2 according to Example 2 shown in FIG. 3 are listed in Table 3. Incidentally, the numbers 1 through 23 of optical surfaces shown in the first column "m" are corresponding respectively to the surface numbers 1 through 23 shown in FIG. 3.

TABLE 3 f = 3.34
NA = 1.25
β = 60x
d0 = 0.25

| m | r | d | nd | νd |
|---|---|---|---|---|
| 1 | −13.293 | 0.63 | 1.45850 | 67.8 |
| 2 | −1.051 | 2.83 | 1.83481 | 42.7 |
| 3 | −2.927 | 0.05 | | |
| 4 | −13.015 | 2.67 | 1.59240 | 68.3 |
| 5 | −6.524 | 0.14 | | |
| 6 | −72.774 | 1.00 | 1.54814 | 45.8 |
| 7 | 13.020 | 8.99 | 1.49782 | 82.5 |
| 8 | −11.217 | 0.18 | | |
| 9 | 42.698 | 0.99 | 1.81600 | 46.6 |
| 10 | 14.629 | 8.00 | 1.43385 | 95.2 |
| 11 | −18.586 | 0.20 | | |
| 12 | 20.648 | 1.21 | 1.75500 | 52.3 |
| 13 | 10.401 | 8.00 | 1.43385 | 95.2 |
| 14 | −17.395 | 0.64 | | |
| 15 | 26.041 | 5.32 | 1.43385 | 95.2 |
| 16 | −13.260 | 1.00 | 1.81600 | 46.6 |
| 17 | 22.681 | 0.19 | | |
| 18 | 7.101 | 5.90 | 1.49782 | 82.5 |
| 19 | −46.414 | 4.61 | 1.69350 | 53.2 |
| 20 | 3.836 | 2.89 | | |
| 21 | −4.589 | 4.38 | 1.48749 | 70.4 |
| 22 | 21.679 | 3.67 | 1.63930 | 44.9 |
| 23 | −9.306 | | | |

[Values for Conditional Expressions]

(1) n32 = 1.63930
(2) ΔPt3/Δνd3 = 0.0062
(3) |f3/fa| = 37.0
(4) |r1/f1| = 0.88
(5) |Φ1 + Φ2| = 0.29

Figure 4:
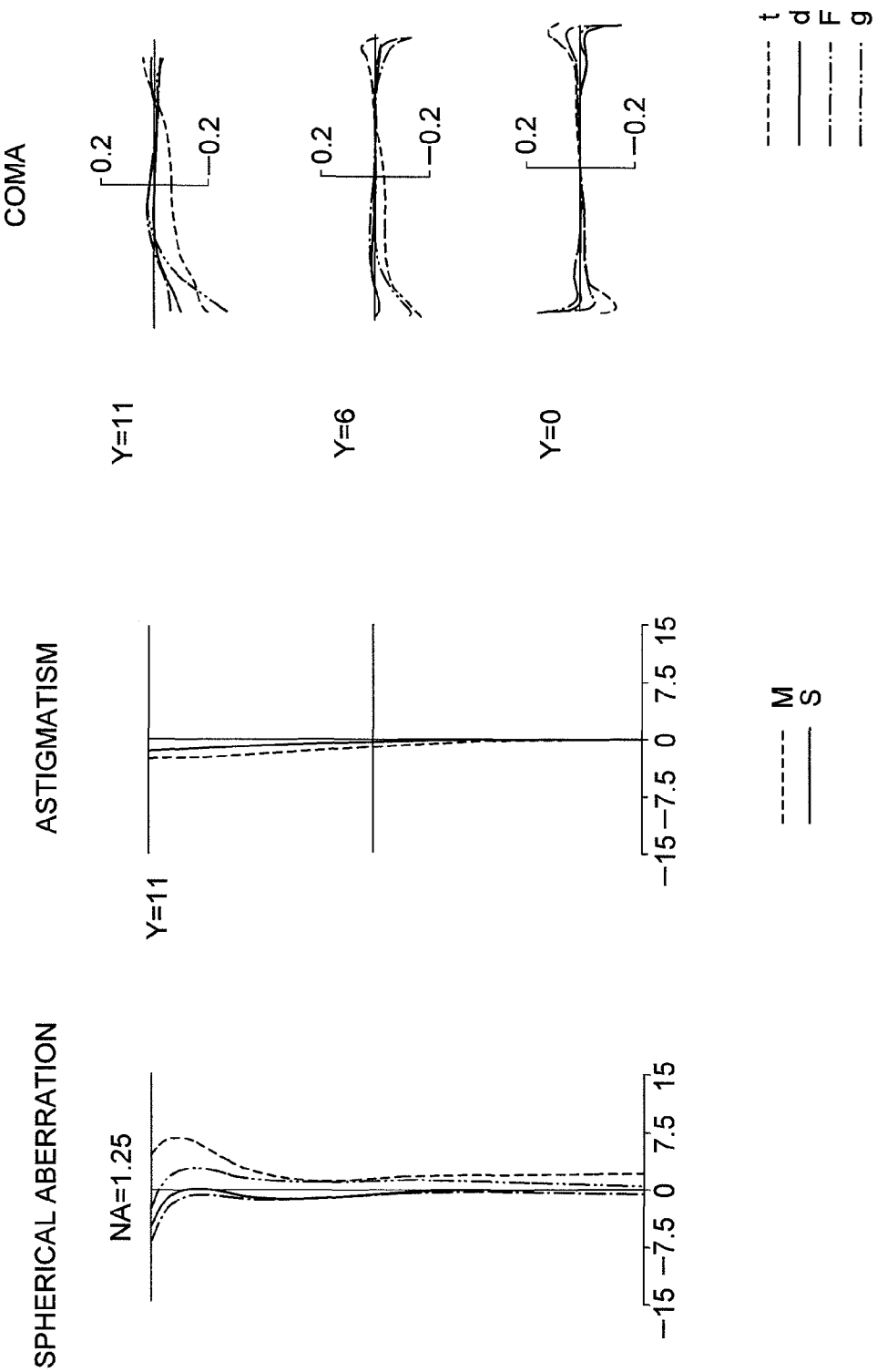
FIG. 4 shows various aberrations of the immersion type microscope objective lens according to Example 2.

As shown above, in Example 2, conditional expressions (1) through (5) are all satisfied. Various aberrations according to Example 2 are shown in FIG. 4. As is apparent from various aberrations shown in FIG. 4, Example 2 shows superb optical performance as a result of good corrections to various aberrations from visible light range to near infrared light range.

Example 3

Figure 5:
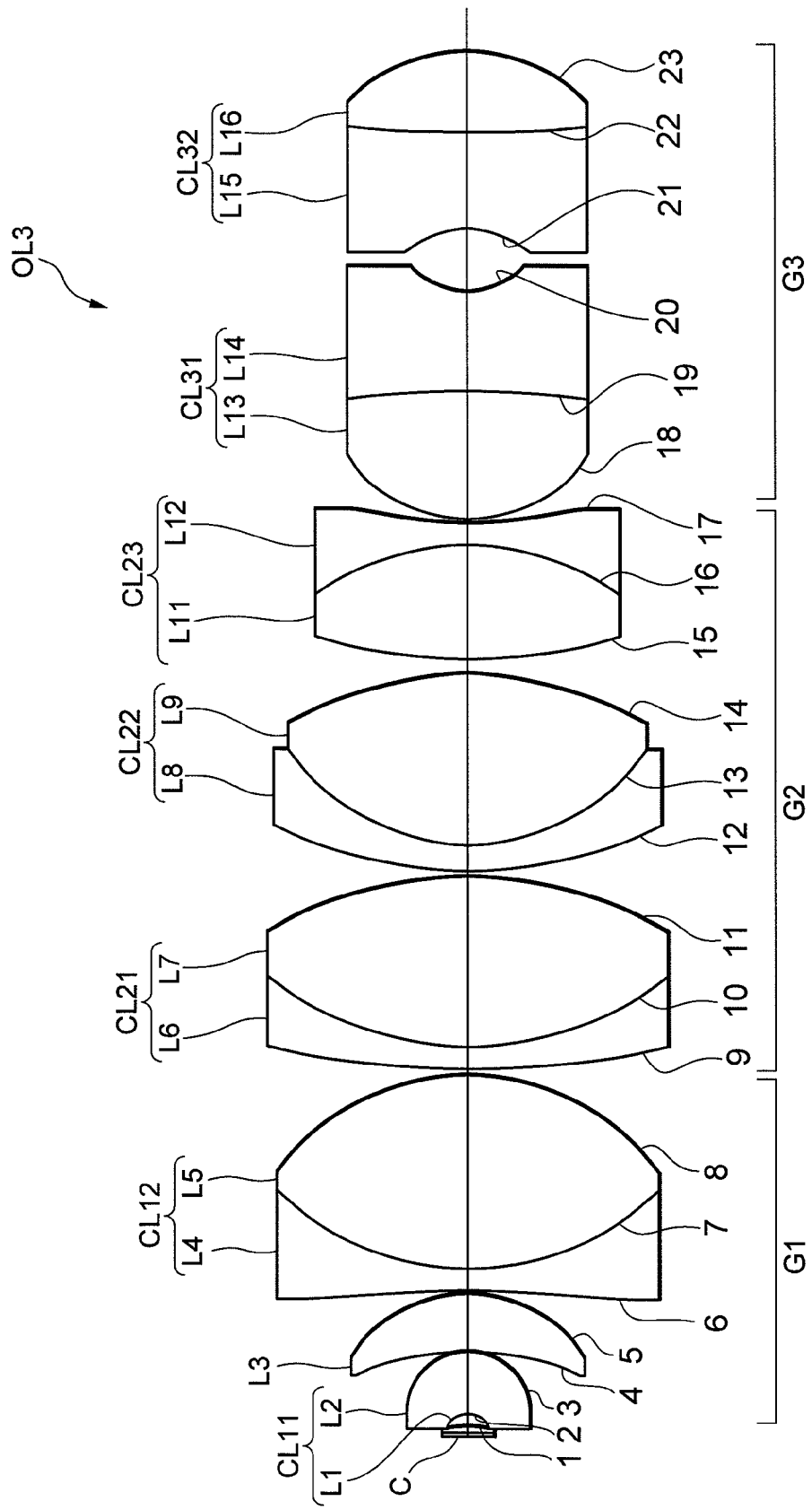
FIG. 5 is a schematic diagram showing a lens construction of an immersion type microscope objective lens according to Example 3 of the present invention.

Then, a microscope objective lens OL3 shown in FIG. 5 is explained as Example 3. The microscope objective lens OL3 shown in FIG. 5 is composed of, in order from the cover glass C side, a first lens group G1 having positive refractive power, a second lens group G2 having positive refractive power and a third lens group G3 having negative refractive power. The first lens group G1 is composed of a cemented lens CL11 constructed by a positive meniscus lens (the first meniscus lens) L1 having a concave surface facing the object side cemented with a negative meniscus lens (the second meniscus lens) L2 having a concave surface facing the object side, a positive meniscus lens L3 having a concave surface facing the object side, and a cemented lens CL12 constructed by a double concave lens L4 cemented with a double convex lens L5. The second lens group G2 is composed of an achromatic lens CL21 constructed by a negative meniscus lens L6 having a convex surface facing the object side cemented with a double convex lens L7, an achromatic lens CL22 constructed by a negative meniscus lens L8 having a convex surface facing the object side cemented with a double convex lens L9, and an achromatic lens CL23 constructed by a double convex lens L11 cemented with a double concave lens L12. The third lens group G3 is composed of an achromatic lens CL31 constructed by a double convex lens L13 cemented with a double concave lens L14, and an achromatic lens CL32 constructed by a double concave lens L15 cemented with a double convex lens L16.

Various values associated with the microscope objective lens OL3 according to Example 3 shown in FIG. 5 are listed in Table 4. Incidentally, the numbers 1 through 23 of optical surfaces shown in the first column "m" are corresponding respectively to the surface numbers 1 through 23 shown in FIG. 5.

TABLE 4 f = 3.33
NA = 1.25
β = 60x
d0 = 0.25

| m | r | d | nd | νd |
|---|---|---|---|---|
| 1 | −13.783 | 0.63 | 1.45850 | 67.8 |
| 2 | −1.050 | 2.85 | 1.83481 | 42.7 |
| 3 | −2.925 | 0.05 | | |
| 4 | −12.352 | 2.67 | 1.59240 | 68.3 |
| 5 | −6.646 | 0.14 | | |
| 6 | −56.736 | 1.00 | 1.54814 | 45.8 |
| 7 | 13.489 | 8.99 | 1.49782 | 82.5 |
| 8 | −11.020 | 0.18 | | |
| 9 | 44.941 | 0.99 | 1.81600 | 46.6 |
| 10 | 15.100 | 8.00 | 1.43385 | 95.2 |
| 11 | −18.935 | 0.20 | | |
| 12 | 20.796 | 1.21 | 1.72916 | 54.7 |
| 13 | 10.260 | 8.00 | 1.43385 | 95.2 |
| 14 | −16.715 | 0.64 | | |
| 15 | 24.965 | 5.32 | 1.43385 | 95.2 |
| 16 | −12.440 | 1.00 | 1.81600 | 46.6 |
| 17 | 23.205 | 0.19 | | |
| 18 | 7.019 | 5.89 | 1.49782 | 82.5 |
| 19 | −50.391 | 4.60 | 1.69350 | 53.2 |
| 20 | 3.826 | 2.89 | | |
| 21 | −4.525 | 4.38 | 1.53172 | 48.8 |
| 22 | 59.115 | 3.67 | 1.62004 | 36.3 |
| 23 | −8.316 | | | |

TABLE 4-continued

[Values for Conditional Expressions]

(1) n32 = 1.62004
(2) ΔPt3/Δvd3 = 0.0055
(3) |f3/fa| = 82.9
(4) |r1/f1| = 0.95
(5) |Φ1 + Φ2| = 0.30

Figure 6:
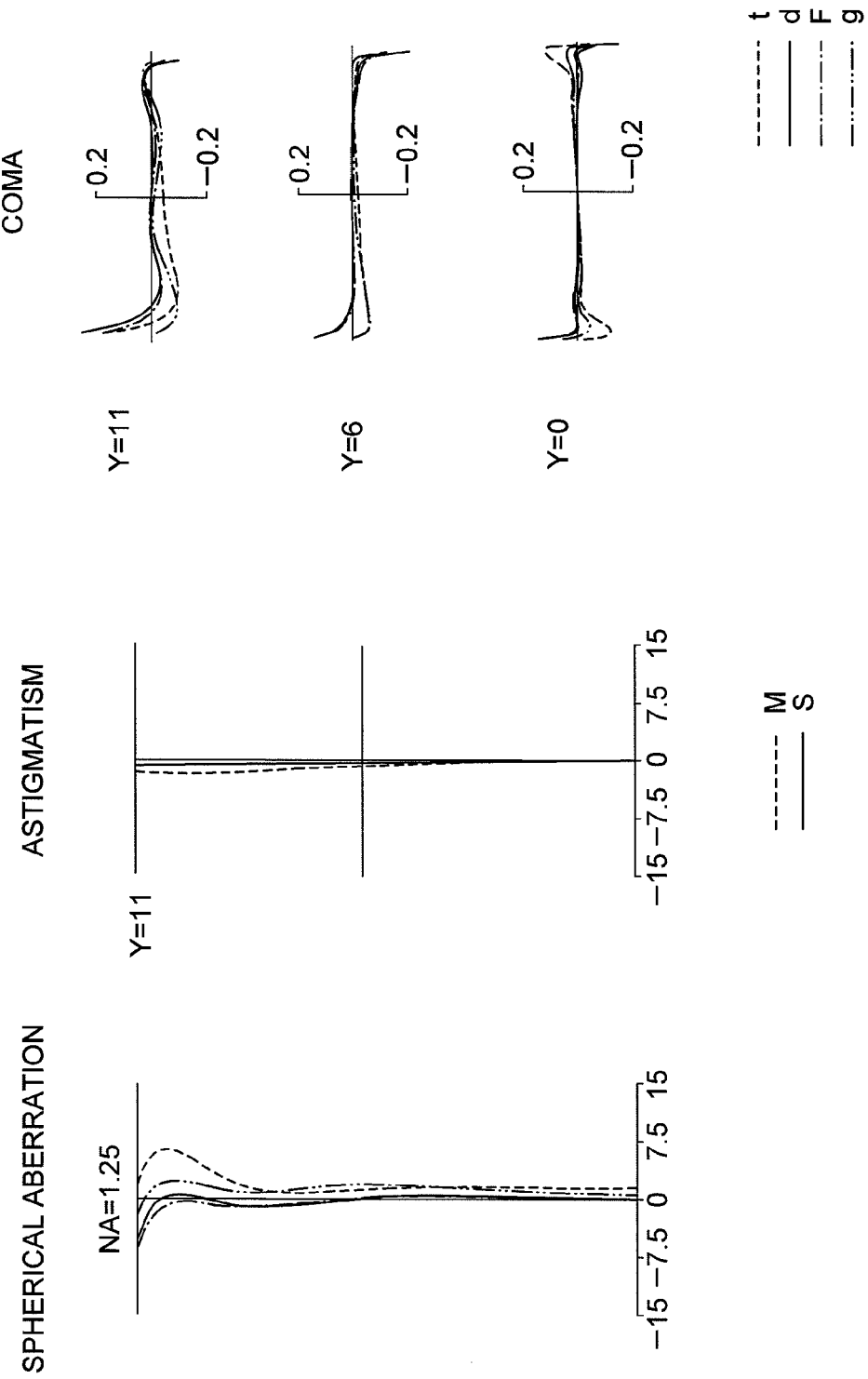
FIG. 6 shows various aberrations of the immersion type microscope objective lens according to Example 3.

As shown above, in Example 3, conditional expressions (1) through (5) are all satisfied. Various aberrations according to Example 3 are shown in FIG. 6. As is apparent from various aberrations shown in FIG. 6, Example 3 shows superb optical performance as a result of good corrections to various aberrations from visible light range to near infrared light range.

Example 4

Figure 7:
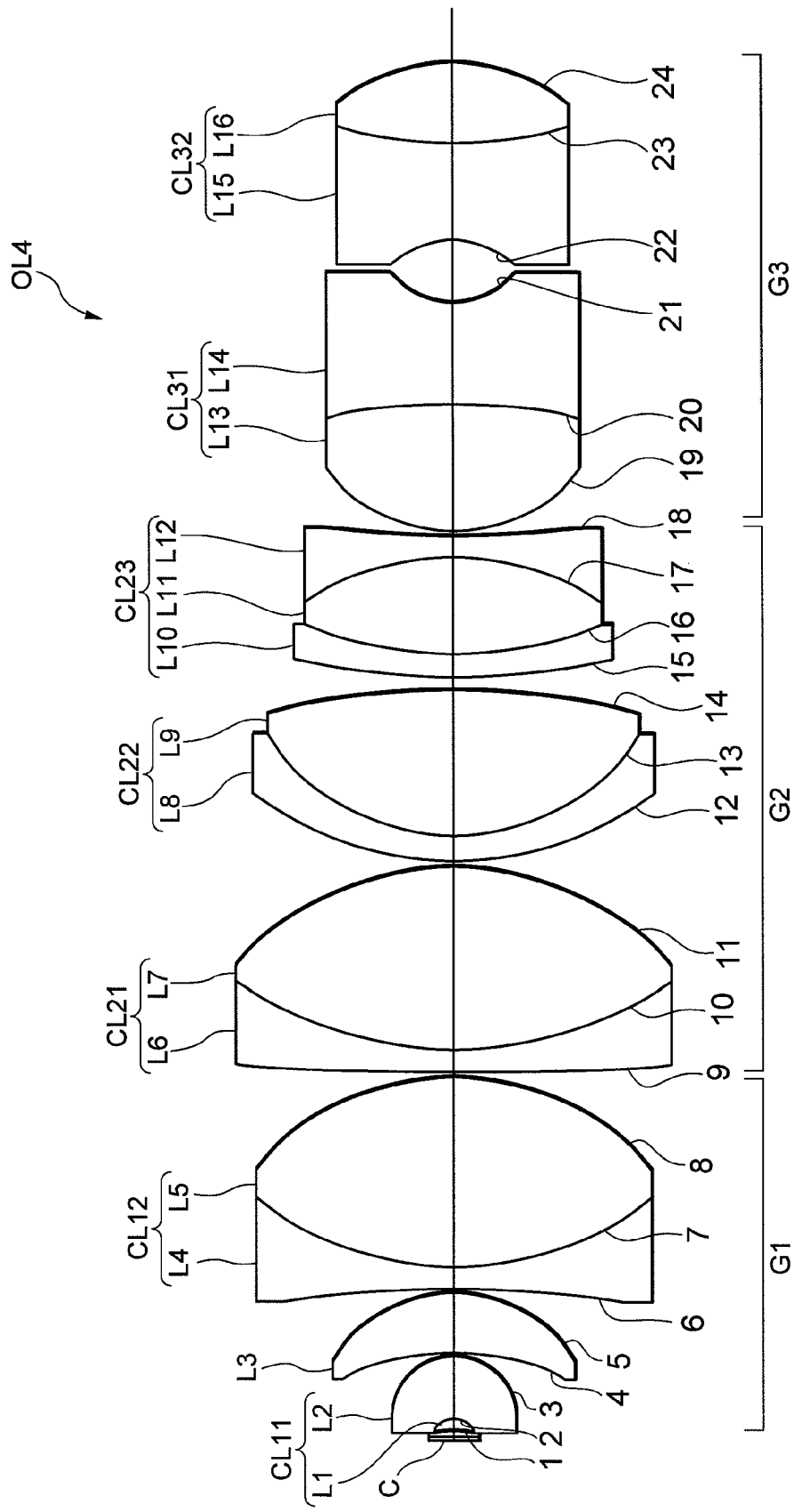
FIG. 7 is a schematic diagram showing a lens construction of an immersion type microscope objective lens according to Example 4 of the present invention.

Then, a microscope objective lens OL4 shown in FIG. 7 is explained as Example 4. The microscope objective lens OL4 shown in FIG. 7 is composed of, in order from a cover glass C side, a first lens group G1 having positive refractive power, a second lens group G2 having positive refractive power, and a third lens group G3 having negative refractive power. The first lens group G1 is composed of a cemented lens CL11 constructed by a positive meniscus lens (the first meniscus lens) L1 having a concave surface facing an object side cemented with a negative meniscus lens (the second meniscus lens) L2 having a concave surface facing the object side, a positive meniscus lens L3 having a concave surface facing the object side, and a cemented lens CL12 constructed by a double concave lens L4 cemented with a double convex lens L5. The second lens group G2 is composed of an achromatic lens CL21 constructed by a negative meniscus lens L6 having a convex surface facing the object side cemented with a double convex lens L7, an achromatic lens CL22 constructed by a negative meniscus lens L8 having a convex surface facing the object side cemented with a double convex lens L9, and an achromatic lens CL23 constructed by a negative meniscus lens L10 having a convex surface facing the object side cemented with a double convex lens L11 cemented with a double concave lens L12. The third lens group G3 is composed of an achromatic lens CL31 constructed by a double convex lens L13 cemented with a double concave lens L14, and an achromatic lens CL32 constructed by a double concave lens L15 cemented with a double convex lens L16.

Various values associated with the microscope objective lens OL4 according to Example 4 shown in FIG. 7 are listed in Table 5. Incidentally, the numbers 1 through 24 of optical surfaces shown in the first column "m" are corresponding respectively to the surface numbers 1 through 24 shown in FIG. 7.

TABLE 5 f = 3.33
NA = 1.25
β = 60x
d0 = 0.25

| m | r | d | nd | vd |
|---|---|---|---|---|
| 1 | −18.647 | 0.63 | 1.45850 | 67.8 |
| 2 | −1.099 | 2.87 | 1.83481 | 42.7 |
| 3 | −2.960 | 0.13 | | |
| 4 | −11.989 | 2.76 | 1.59240 | 68.3 |
| 5 | −6.596 | 0.15 | | |
| 6 | −53.172 | 1.00 | 1.54814 | 45.8 |
| 7 | 14.965 | 8.85 | 1.49782 | 82.5 |
| 8 | −12.104 | 0.20 | | |
| 9 | 178.398 | 1.00 | 1.81600 | 46.6 |
| 10 | 18.015 | 8.50 | 1.43385 | 95.2 |
| 11 | −13.725 | 0.20 | | |
| 12 | 15.567 | 1.20 | 1.72916 | 54.7 |
| 13 | 10.456 | 6.80 | 1.43385 | 95.2 |
| 14 | −35.194 | 0.60 | | |
| 15 | 33.649 | 1.10 | 1.81600 | 46.6 |
| 16 | 18.234 | 4.50 | 1.43385 | 95.2 |
| 17 | −12.837 | 1.00 | 1.81600 | 46.6 |
| 18 | 59.127 | 0.20 | | |
| 19 | 7.590 | 5.90 | 1.49782 | 82.5 |
| 20 | −28.943 | 4.59 | 1.64000 | 60.1 |
| 21 | 3.940 | 2.90 | | |
| 22 | −4.497 | 4.40 | 1.48749 | 70.4 |
| 23 | 19.348 | 3.70 | 1.56732 | 42.8 |
| 24 | −8.913 | | | |

[Values for Conditional Expressions]

(1) n32 = 1.56732
(2) ΔPt3/Δvd3 = 0.0059
(3) |f3/fa| = 88.3
(4) |r1/f1| = 1.46
(5) |Φ1 + Φ2| = 0.27

Figure 8:
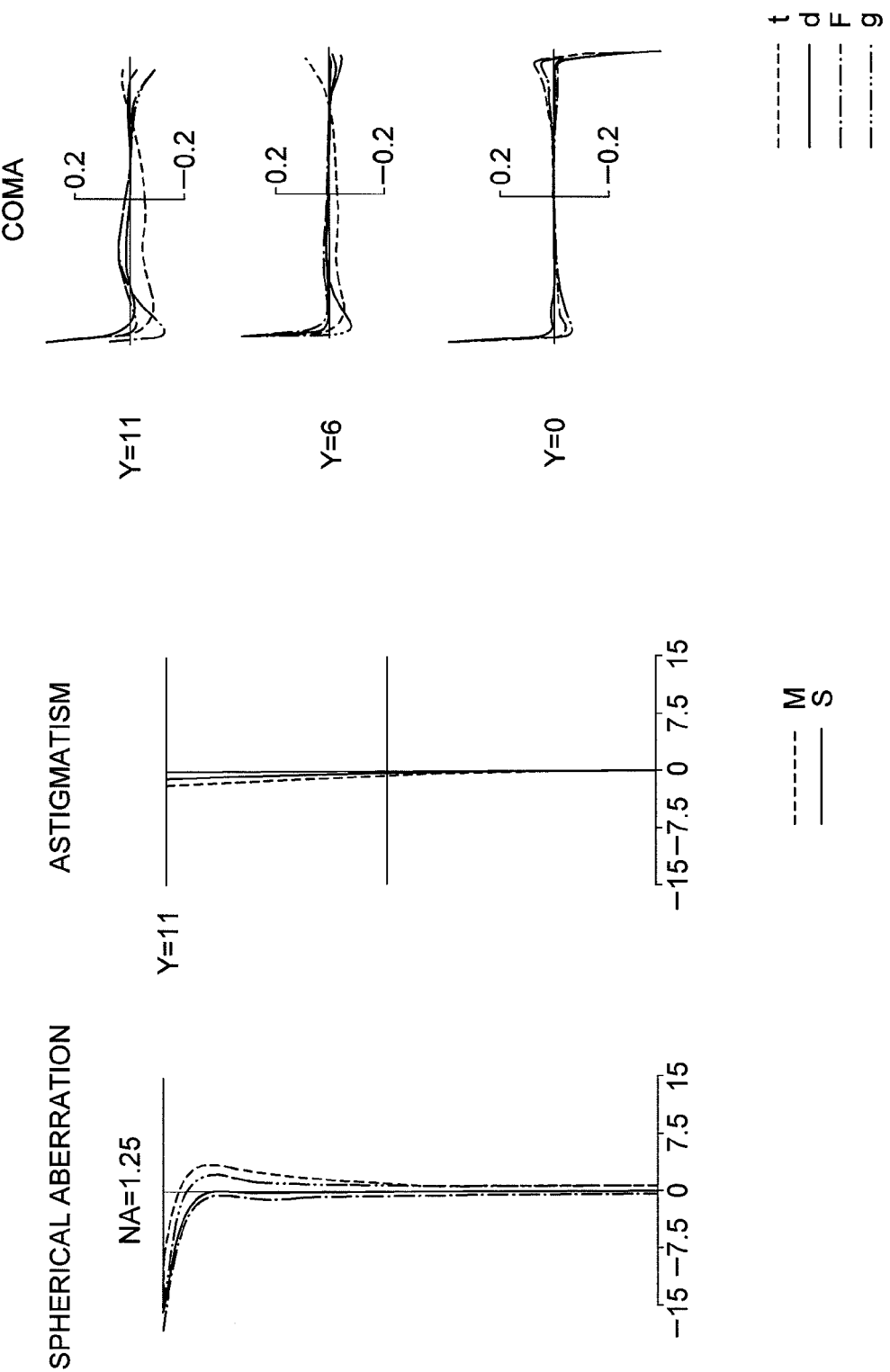
FIG. 8 shows various aberrations of the immersion type microscope objective lens according to Example 4.

As shown above, in Example 4, conditional expressions (1) through (5) are all satisfied. Various aberrations according to Example 4 are shown in FIG. 8. As is apparent from various aberrations shown in FIG. 8, Example 4 shows superb optical performance as a result of good corrections to various aberrations from visible light range to near infrared light range.

Example 5

Figure 9:
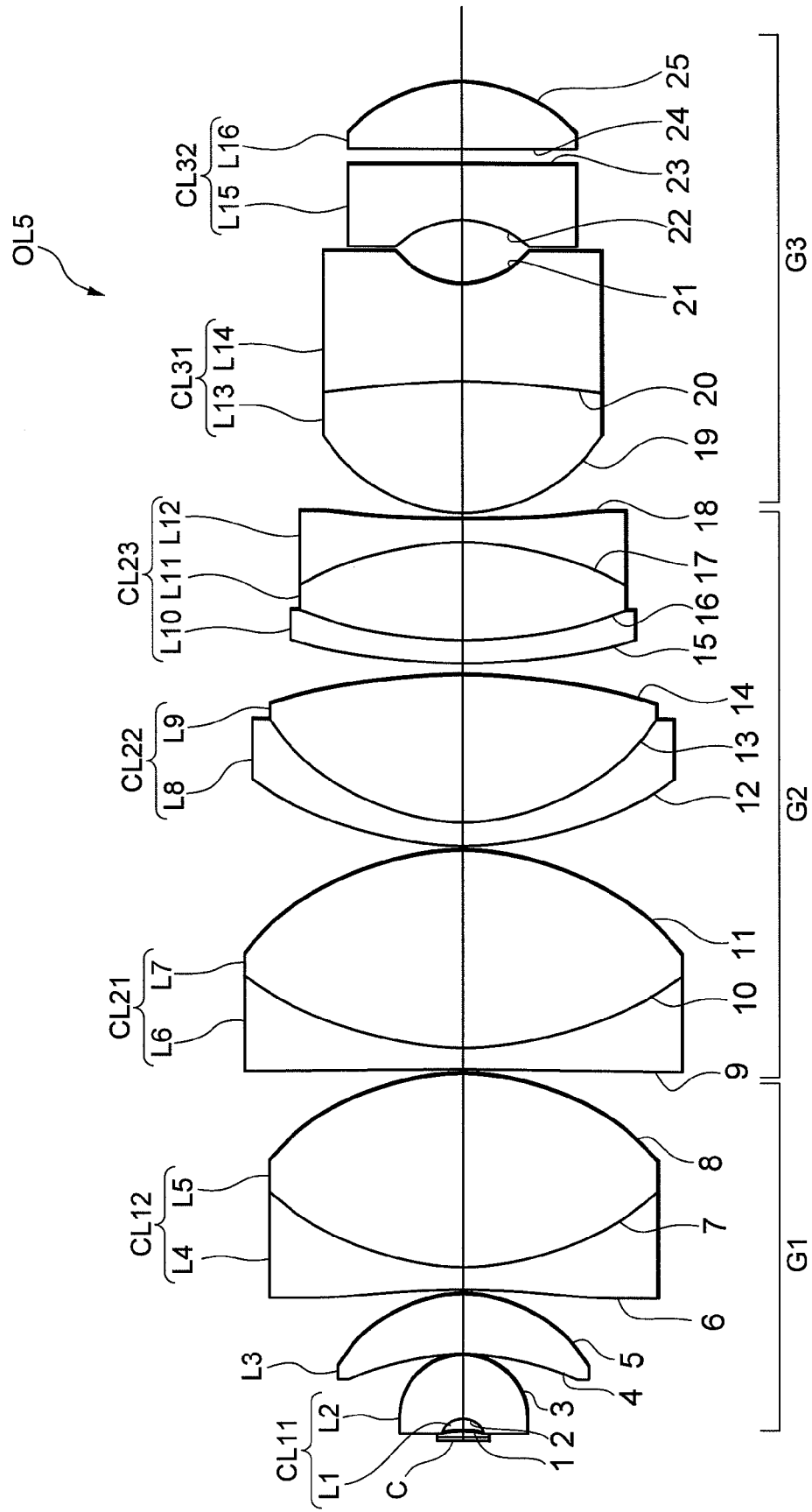
FIG. 9 is a schematic diagram showing a lens construction of an immersion type microscope objective lens according to Example 5 of the present invention.

Then, a microscope objective lens OL5 shown in FIG. 9 is explained as Example 5. The microscope objective lens OL5 shown in FIG. 9 is composed of, in order from a cover glass C side, a first lens group G1 having positive refractive power, a second lens group G2 having positive refractive power, and a third lens group G3 having negative refractive power. The first lens group G1 is composed of a cemented lens CL11 constructed by a positive meniscus lens (the first meniscus lens) L1 having a concave surface facing an object side cemented with a negative meniscus lens (the second meniscus lens) L2 having a concave surface facing the object side, a positive meniscus lens L3 having a concave surface facing the object side, and a cemented lens CL12 constructed by a double concave lens L4 cemented with a double convex lens L5. The second lens group G2 is composed of an achromatic lens CL21 constructed by a double concave lens L6 cemented with a double convex lens L7, an achromatic lens CL22 constructed by a negative meniscus lens L8 having a convex surface facing the object side cemented with a double convex lens L9, and an achromatic lens CL23 constructed by a negative meniscus lens L10 having a convex surface facing the object side cemented with a double convex lens L11 cemented with a double concave lens L12. The third lens group G3 is composed of an achromatic lens CL31 constructed by a double convex lens L13 cemented with a double concave lens L14, and an achromatic lens CL32 constructed by a double concave lens L15 and a double convex lens L16 disposed with an air space in between.

Various values associated with the microscope objective lens OL5 according to Example 5 shown in FIG. 9 are listed in Table 6. Incidentally, the numbers 1 through 25 of optical surfaces shown in the first column "m" are corresponding respectively to the surface numbers 1 through 25 shown in FIG. 9.

TABLE 6 f = 3.33
NA = 1.25
β = 60x
d0 = 0.25

| m | r | d | nd | vd |
|---|---|---|---|---|
| 1 | −11.000 | 0.63 | 1.45850 | 67.8 |
| 2 | −1.051 | 2.82 | 1.83481 | 42.7 |
| 3 | −2.914 | 0.10 | | |
| 4 | −12.431 | 2.72 | 1.59240 | 68.3 |
| 5 | −6.681 | 0.17 | | |
| 6 | −66.400 | 1.05 | 1.51742 | 52.4 |
| 7 | 13.340 | 8.84 | 1.49782 | 82.5 |
| 8 | −12.027 | 0.18 | | |
| 9 | −455.651 | 0.99 | 1.81600 | 46.6 |
| 10 | 17.147 | 9.03 | 1.43385 | 95.2 |
| 11 | −13.157 | 0.17 | | |
| 12 | 16.911 | 1.13 | 1.75500 | 52.3 |
| 13 | 10.745 | 6.80 | 1.43385 | 95.2 |
| 14 | −29.213 | 0.52 | | |
| 15 | 29.830 | 1.07 | 1.81600 | 46.6 |
| 16 | 20.985 | 4.49 | 1.43385 | 95.2 |
| 17 | −15.194 | 1.06 | 1.81600 | 46.6 |
| 18 | 58.993 | 0.28 | | |
| 19 | 7.549 | 5.98 | 1.49782 | 82.5 |
| 20 | −44.321 | 4.41 | 1.65160 | 58.5 |
| 21 | 3.775 | 2.87 | | |
| 22 | −4.494 | 2.50 | 1.61800 | 63.3 |
| 23 | 235.350 | 0.71 | | |
| 24 | 1093.290 | 3.02 | 1.59551 | 39.2 |
| 25 | −7.185 | | | |

[Values for Conditional Expressions]

(1) n32 = 1.59551
(2) ΔPt3/Δvd3 = 0.0038
(3) |f3/fa| = 32.6
(4) |r1/f1| = 0.71
(5) |Φ1 + Φ2| = 0.31

Figure 10:
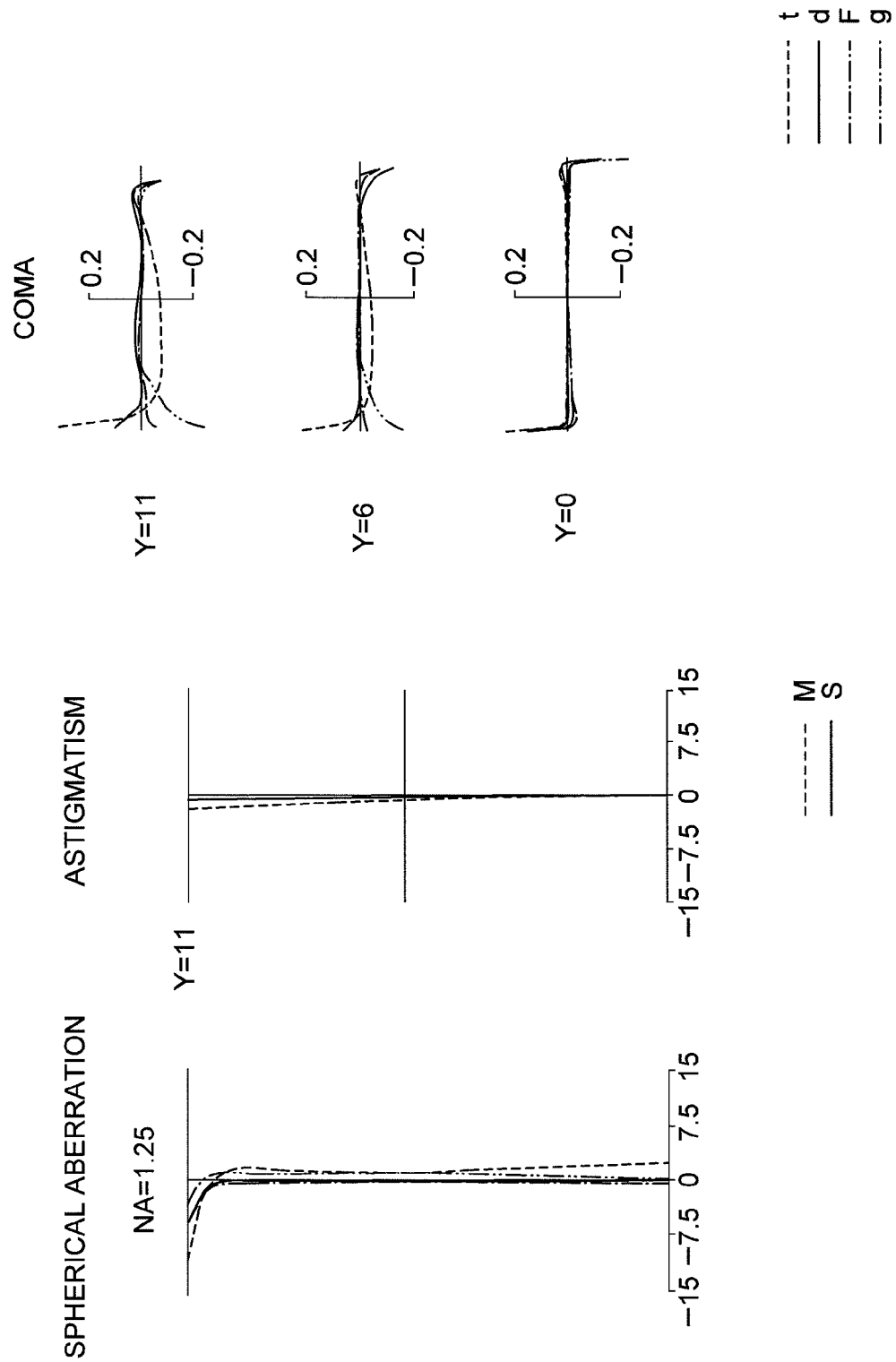
FIG. 10 shows various aberrations of the immersion type microscope objective lens according to Example 5.

As shown above, in Example 5, conditional expressions (1) through (5) are all satisfied. Various aberrations according to Example 5 are shown in FIG. 10. As is apparent from various aberrations shown in FIG. 10, Example 5 shows superb optical performance as a result of good corrections to various aberrations from visible light range to near infrared light range.

Example 6

Figure 11:
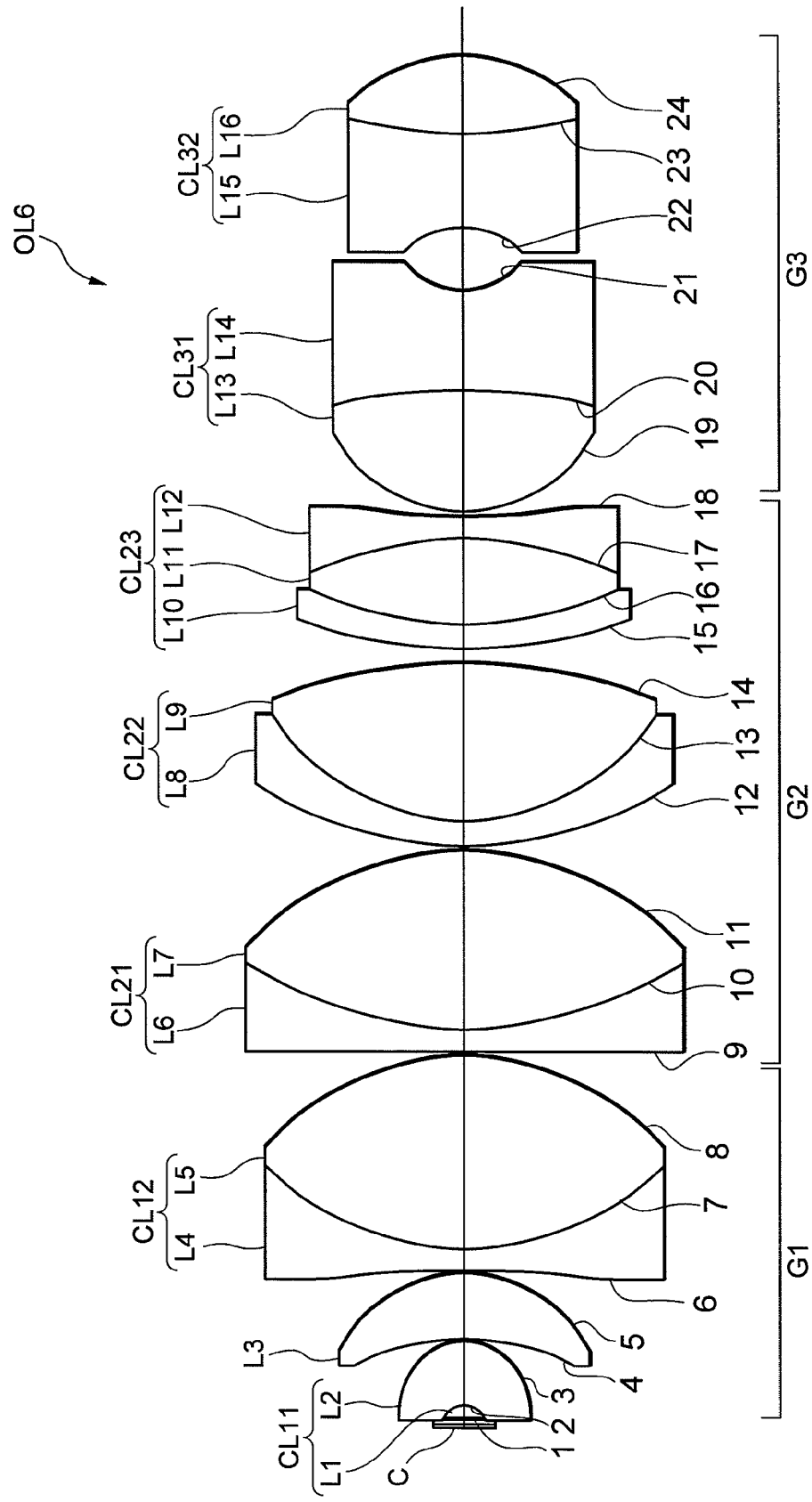
FIG. 11 is a schematic diagram showing a lens construction of an immersion type microscope objective lens according to Example 6 of the present invention.

Then, a microscope objective lens OL6 shown in FIG. 11 is explained as Example 6. The microscope objective lens OL6 shown in FIG. 11 is composed of, in order from a cover glass C side, a first lens group G1 having positive refractive power, a second lens group G2 having positive refractive power, and a third lens group G3 having negative refractive power. The first lens group G1 is composed of a cemented lens CL11 constructed by a positive meniscus lens (the first meniscus lens) L1 having a concave surface facing an object side cemented with a negative meniscus lens (the second meniscus lens) L2 having a concave surface facing the object side, a positive meniscus lens L3 having a concave surface facing the object side, and a cemented lens CL12 constructed by a double concave lens L4 cemented with a double convex lens L5. The second lens group G2 is composed of an achromatic lens CL21 constructed by a double concave lens L6 cemented with a double convex lens L7, an achromatic lens CL22 constructed by a negative meniscus lens L8 having a convex surface facing the object side cemented with a double convex lens L9, and an achromatic lens CL23 constructed by a negative meniscus lens L10 having a convex surface facing the object side cemented with a double convex lens L11 cemented with a double concave lens L12. The third lens group G3 is composed of an achromatic lens CL31 constructed by a double convex lens L13 cemented with a double concave lens L14, and an achromatic lens CL32 constructed by a double concave lens L15 cemented with a double convex lens L16.

Various values associated with the microscope objective lens OL6 according to Example 6 shown in FIG. 11 are listed in Table 7. Incidentally, the numbers 1 through 24 of optical surfaces shown in the first column "m" are corresponding respectively to the surface numbers 1 through 24 shown in FIG. 11.

TABLE 7 f = 3.36
NA = 1.25
β = 60x
d0 = 0.25

| m | r | d | nd | vd |
|---|---|---|---|---|
| 1 | −10.008 | 0.60 | 1.45850 | 67.8 |
| 2 | −1.120 | 3.00 | 1.83481 | 42.7 |
| 3 | −3.092 | 0.10 | | |
| 4 | −11.893 | 3.10 | 1.59240 | 68.3 |
| 5 | −6.601 | 0.10 | | |
| 6 | −61.840 | 1.00 | 1.51742 | 52.4 |
| 7 | 13.200 | 9.05 | 1.49782 | 82.5 |
| 8 | −12.655 | 0.20 | | |
| 9 | −541.810 | 1.00 | 1.81600 | 46.6 |
| 10 | 19.000 | 8.40 | 1.43385 | 95.2 |
| 11 | −14.078 | 0.20 | | |
| 12 | 18.411 | 1.20 | 1.71300 | 53.9 |
| 13 | 10.900 | 7.40 | 1.43385 | 95.2 |
| 14 | −25.231 | 0.60 | | |
| 15 | 22.770 | 1.15 | 1.81600 | 46.6 |
| 16 | 17.650 | 4.10 | 1.43385 | 95.2 |
| 17 | −16.499 | 1.00 | 1.81600 | 46.6 |
| 18 | 40.229 | 0.20 | | |
| 19 | 7.049 | 5.75 | 1.43425 | 95.0 |
| 20 | −27.649 | 4.60 | 1.62041 | 60.3 |
| 21 | 3.816 | 2.90 | | |
| 22 | −4.522 | 4.40 | 1.60300 | 65.4 |
| 23 | 20.900 | 3.70 | 1.57501 | 41.5 |
| 24 | −7.856 | | | |

[Values for Conditional Expressions]

(1) n32 = 1.57501
(2) ΔPt3/Δvd3 = 0.0041
(3) |f3/fa| = 24.9
(4) |r1/f1| = 0.58
(5) |Φ1 + Φ2| = 0.30

Figure 12:
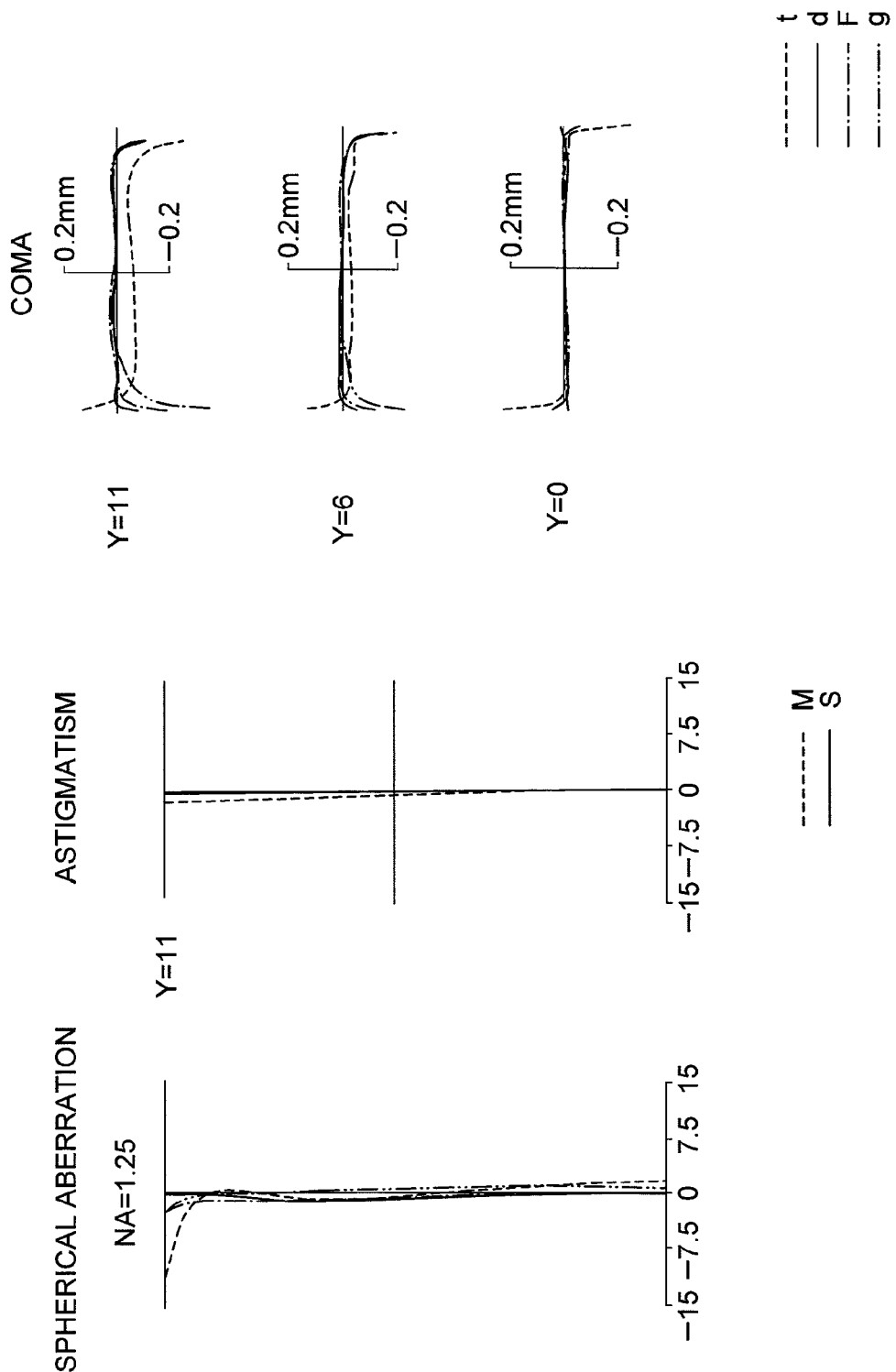
FIG. 12 shows various aberrations of the immersion type microscope objective lens according to Example 6.

As shown above, in Example 6, conditional expressions (1) through (5) are all satisfied. Various aberrations according to Example 6 are shown in FIG. 12. As is apparent from various aberrations shown in FIG. 12, Example 6 shows superb optical performance as a result of good corrections to various aberrations from visible light range to near infrared light range.

Example 7

Figure 13:
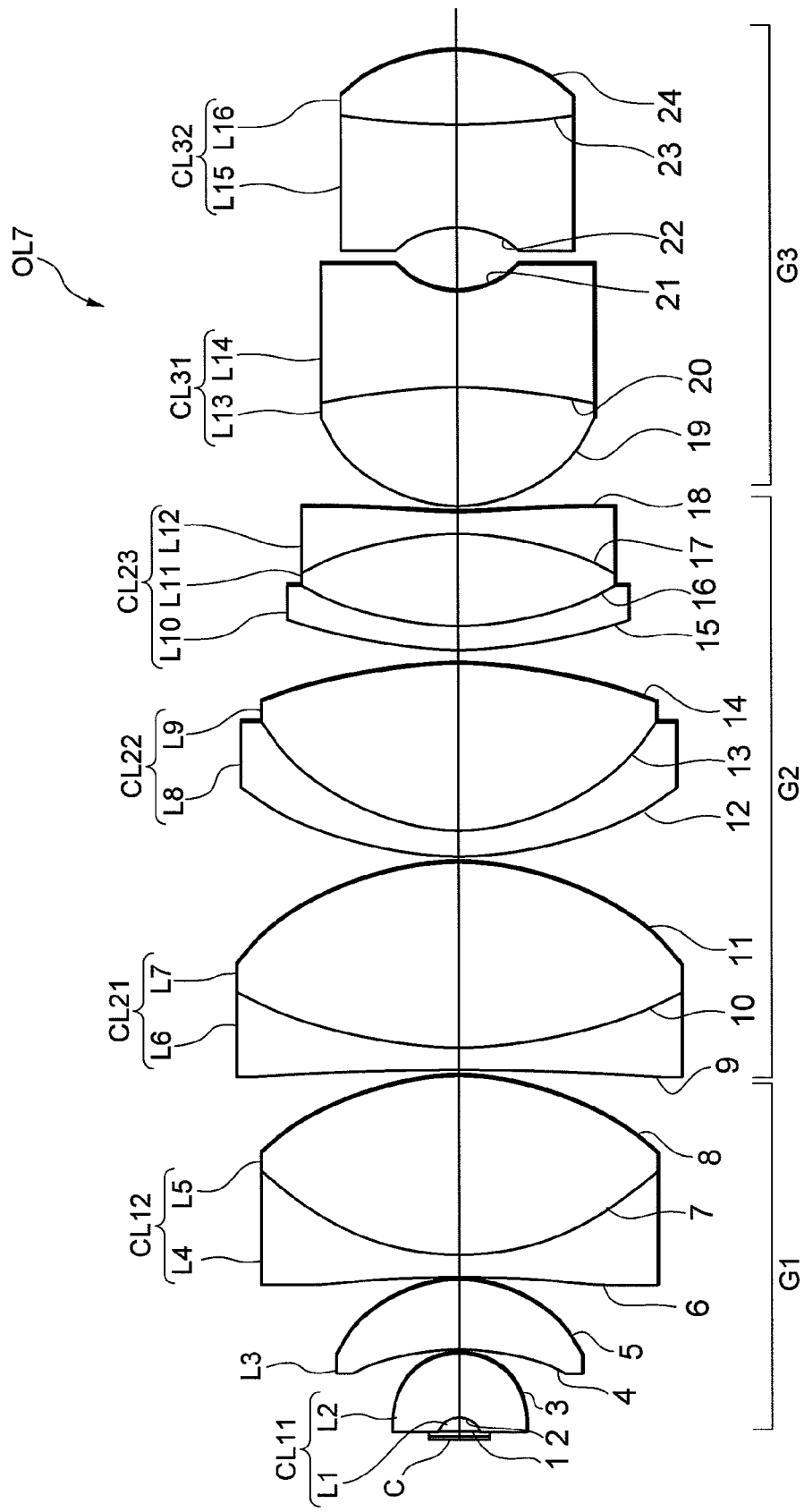
FIG. 13 is a schematic diagram showing a lens construction of an immersion type microscope objective lens according to Example 7 of the present invention.

Lastly, a microscope objective lens OL7 shown in FIG. 13 is explained as Example 7. The microscope objective lens OL7 shown in FIG. 13 is composed of, in order from a cover glass C side, a first lens group G1 having positive refractive power, a second lens group G2 having positive refractive power, and a third lens group G3 having negative refractive power. The first lens group G1 is composed of a cemented lens CL11 constructed by a positive meniscus lens (the first meniscus lens) L1 having a concave surface facing an object side cemented with a negative meniscus lens (the second meniscus lens) L2 having a concave surface facing the object side, a positive meniscus lens L3 having a concave surface facing the object side, and a cemented lens CL12 constructed by a double concave lens L4 cemented with a double convex lens L5. The second lens group G2 is composed of an achromatic lens CL21 constructed by a double concave lens L6 cemented with a double convex lens L7, an achromatic lens CL22 constructed by a negative meniscus lens L8 having a convex surface facing the object side cemented with a double convex lens L9, and an achromatic lens CL23 constructed by a negative meniscus lens L10 having a convex surface facing the object side cemented with a double convex lens L11 cemented with a double concave lens L12. The third lens group G3 is composed of an achromatic lens CL31 constructed by a double convex lens L13 cemented with a double concave lens L14, and an achromatic lens CL32 constructed by a double concave lens L15 cemented with a double convex lens L16.

Various values associated with the microscope objective lens OL7 according to Example 7 shown in FIG. 13 are listed in Table 8. Incidentally, the numbers 1 through 24 of optical surfaces shown in the first column "m" are corresponding respectively to the surface numbers 1 through 24 shown in FIG. 13.

TABLE 8 f = 3.33
NA = 1.25
β = 60x
d0 = 0.25

| m | r | d | nd | vd |
|---|---|---|---|---|
| 1 | −10.008 | 0.60 | 1.45850 | 67.8 |
| 2 | −1.261 | 3.05 | 1.83481 | 42.7 |
| 3 | −3.135 | 0.10 | | |
| 4 | −11.668 | 3.22 | 1.56907 | 71.3 |
| 5 | −6.486 | 0.10 | | |
| 6 | −69.996 | 1.02 | 1.51742 | 52.4 |
| 7 | 12.900 | 8.30 | 1.49782 | 82.5 |
| 8 | −13.549 | 0.20 | | |
| 9 | −137.906 | 1.00 | 1.81600 | 46.6 |
| 10 | 21.954 | 8.60 | 1.43385 | 95.2 |
| 11 | −13.653 | 0.20 | | |
| 12 | 17.921 | 1.17 | 1.73400 | 51.5 |
| 13 | 10.941 | 7.80 | 1.43385 | 95.2 |
| 14 | −24.949 | 0.60 | | |
| 15 | 23.338 | 1.08 | 1.81600 | 46.6 |
| 16 | 15.460 | 4.29 | 1.43385 | 95.2 |
| 17 | −16.030 | 1.01 | 1.81600 | 46.6 |
| 18 | 73.530 | 0.20 | | |
| 19 | 7.213 | 5.49 | 1.43425 | 95.0 |
| 20 | −30.803 | 4.41 | 1.60300 | 65.4 |
| 21 | 4.080 | 2.95 | | |
| 22 | −4.655 | 4.70 | 1.62280 | 57.1 |
| 23 | 35.888 | 3.40 | 1.59270 | 35.3 |
| 24 | −8.534 | | | |

[Values for Conditional Expressions]

(1) n32 = 1.59270
(2) ΔPt3/Δvd3 = 0.0052
(3) |f3/fa| = 16.2
(4) |r1/f1| = 0.76
(5) |Φ1 + Φ2| = 0.28

Figure 14:
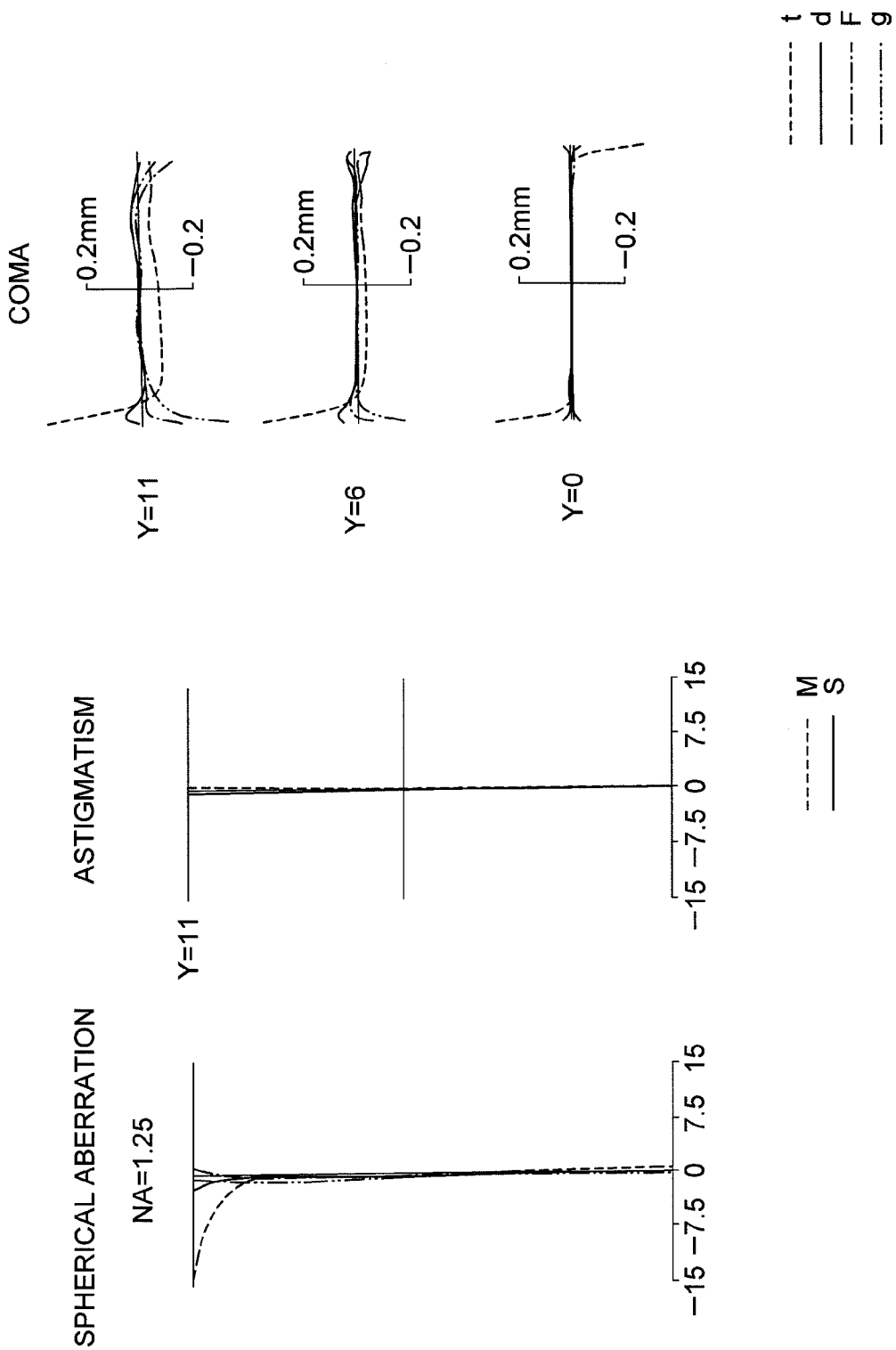
FIG. 14 shows various aberrations of the immersion type microscope objective lens according to Example 7.

As shown above, in Example 7, conditional expressions (1) through (5) are all satisfied. Various aberrations according to Example 7 are shown in FIG. 14. As is apparent from various aberrations shown in FIG. 14, Example 7 shows superb optical performance as a result of good corrections to various aberrations from visible light range to near infrared light range.

What is claimed is:
1. An immersion microscope objective lens comprising, in order from an object side:
a first lens group having positive refractive power;
a second lens group having positive refractive power; and
a third lens group having negative refractive power;
the first lens group including at least one cemented lens,
the second lens group including at least two achromatic lenses, each of which includes a positive lens and a negative lens,
the third lens group being composed of, in order from the object side, an achromatic lens that includes a positive lens and a negative lens and has a strong concave surface facing an image side, and an achromatic lens that includes a positive lens and a negative lens and has a strong concave surface facing the object side,
the following conditional expression being satisfied:

$1.5 \leq n32 \leq 1.65$, where n32 denotes a refractive index at d-line of a glass material of the positive lens included in the achromatic lens disposed to the most image side of the third lens group,
when Pt is defined by the following expression:

$Pt=(nd-nt)/(ng-nd)$ where nd denotes a refractive index at d-line of a glass material of each lens included in the achromatic lens disposed to the most image side of the third lens group, nt denotes a refractive index at t-line thereof, and ng denotes a refractive index at g-line thereof,
and when ΔPt3 and Δvd3 is defined by the following expressions:

$\Delta Pt3 = |Pt31 - Pt32|$ $\Delta vd3 = |vd31 - vd32|$ where Pt31 denotes the Pt value of the negative lens included in the achromatic lens disposed to the most image side of the third lens group, vd31 denotes an Abbe number thereof, Pt32 denotes the Pt value of the positive lens included in the achromatic lens disposed to the most image side of the third lens group, vd32 denotes an Abbe number thereof,
ΔPt3 and Δvd3 satisfying the following conditional expression:

$0.0035 \leq \Delta Pt3/\Delta vd3 \leq 0.0062$, the following conditional expression being satisfied:

$15 \leq |f3/fa|$ where f3 denotes a focal length of the achromatic lens disposed to the most image side among achromatic lenses included in the third lens group, and fa denotes a focal length of the microscope objective lens,
one cemented lens included in the first lens group being disposed to the most object side of the first lens group and constructed by, in order from the object side, a first meniscus lens having a concave surface facing the object side cemented with a second meniscus lens having a concave surface facing the object side, and
the following conditional expression being satisfied:

$0.2 \leq |r1/f1| \leq 4.5$ where r1 denotes a radius of curvature of the object side surface of the first meniscus lens included in the cemented lens disposed to the most object side of the first lens group, and f1 denotes a focal length of the cemented lens in which the first meniscus lens is included.

2. The immersion microscope objective lens according to claim 1, wherein the following conditional expression is satisfied:

$$0.25 \leq |\Phi 1 + \Phi 2| \leq 0.35$$

where $\Phi 1$ denotes power of the concave surface of the achromatic lens having the strong concave surface facing the image side among achromatic lenses included in the third lens group, and $\Phi 2$ denotes power of the concave surface of the achromatic lens having the strong concave surface facing the object side among achromatic lenses included in the third lens group.

* * * * *